(12) United States Patent
Yoshida et al.

(10) Patent No.: US 7,530,389 B2
(45) Date of Patent: May 12, 2009

(54) HEAT EXCHANGER AND EVAPORATOR

(75) Inventors: Nobuyoshi Yoshida, Wako (JP); Satoshi Hanai, Haga-gun (JP); Takeshi Yamagami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 731 days.

(21) Appl. No.: 10/819,851

(22) Filed: Apr. 6, 2004

(65) Prior Publication Data

US 2004/0200605 A1 Oct. 14, 2004

(30) Foreign Application Priority Data

Apr. 8, 2003 (JP) ............................. 2003-104105

(51) Int. Cl.
*F28D 7/10* (2006.01)
*H01M 8/04* (2006.01)

(52) U.S. Cl. ..................... 165/154; 165/113; 165/145

(58) Field of Classification Search ......... 165/141–142, 165/145, 152, 154, 155, 113, 60, 911, 104.11; 429/26, 20; 123/557; 159/28.6, 23

See application file for complete search history.

(56) References Cited

U.S. PATENT DOCUMENTS

| | | | | |
|---|---|---|---|---|
| 784,716 | A | * 3/1905 | Voohees | ..................... 165/142 |
| 2,117,337 | A | * 5/1938 | Lobl | ........................ 159/27.1 |
| 2,134,058 | A | 10/1938 | Ris | |
| 2,155,666 | A | * 4/1939 | Leidig | ........................ 165/143 |
| 2,372,079 | A | * 3/1945 | Gunter | ........................ 165/141 |
| 2,392,255 | A | * 1/1946 | McAndrews | ................. 159/23 |
| 3,118,495 | A | 1/1964 | Hagby | |
| 3,196,198 | A | * 7/1965 | Rex | ...................... 264/328.16 |
| 3,213,938 | A | 10/1965 | Matthews et al. | |
| 3,360,036 | A | 12/1967 | Holyfield | |
| 4,163,474 | A | 8/1979 | MacDonald et al. | |
| 4,925,526 | A | * 5/1990 | Havukainen | ............... 159/13.3 |

(Continued)

FOREIGN PATENT DOCUMENTS

EP 0144189 A2 6/1985

(Continued)

OTHER PUBLICATIONS

Canadian Office Action for Application No. 2,463,279, dated Jun. 10, 2008.

(Continued)

*Primary Examiner*—Tho v Duong
(74) *Attorney, Agent, or Firm*—Lahive & Cockfield, LLP; Anthony A. Laurentano, Esq.

(57) ABSTRACT

A heat exchanger includes: a casing; an external cylinder which is arranged inside the casing with a clearance formed between the external cylinder and an inner surface of the casing and is supported in a cantilevered manner, has a closed end portion, and forms a first fluid passage between the external cylinder and the casing; and an internal cylinder which is arranged inside the external cylinder with a clearance formed between the internal cylinder and an inner surface of the external cylinder and is supported in a cantilevered manner, is open at both ends, and forms a second fluid passage, which is turned around at the closed end portion of the external cylinder, between the internal cylinder and the external cylinder.

18 Claims, 19 Drawing Sheets

U.S. PATENT DOCUMENTS

| | | | |
|---|---|---|---|
| 5,735,342 A * | 4/1998 | Nitta | 165/122 |
| 6,550,532 B1 * | 4/2003 | Nakamura et al. | 165/115 |
| 6,623,719 B2 * | 9/2003 | Lomax et al. | 423/652 |
| 2002/0131921 A1 * | 9/2002 | Ishikawa | 422/198 |

FOREIGN PATENT DOCUMENTS

| | | |
|---|---|---|
| JP | 52-57551 | 5/1977 |
| JP | S63-179401 | 11/1988 |
| JP | 2001-135331 | 5/2001 |

OTHER PUBLICATIONS

Japanese Office Action for Application No. 2003-104105, dated Sep. 26, 2006.

* cited by examiner

HEAT EXCHANGER AND EVAPORATOR

BACKGROUND OF THE INVENTION

1. Field of the Invention

The present invention relates to a heat exchanger and an evaporator using the heat exchanger.

Priority is claimed on Japanese Patent Application No. 2003-104105, filed Apr. 8, 2003, the content of which is incorporated herein by reference.

2. Description of the Related Art

As a method of supplying a fuel gas to a fuel cell, in some cases, a raw fuel of a liquid containing hydrocarbons such as methanol or gasoline is reformed into a hydrogen-rich fuel gas (hereinafter abbreviated as hydrogen-rich gas) by a reforming system, and this hydrogen-rich gas is supplied as a fuel gas for the fuel cell.

In this reforming system, a liquid fuel (raw material) consisting of a mixed solution of a raw fuel and water is evaporated by an evaporator to be converted into a raw fuel gas, and the raw fuel gas is supplied to a reformer together with a reforming air to cause a reforming reaction. Then, the raw fuel gas is reformed into a hydrogen-rich gas by the reforming reaction. The evaporator of this type is disclosed in, for example, Japanese Unexamined Patent Application, First Publication No. 2001-135331.

Incidentally, there is an evaporator of a heat exchanger type. The evaporator generates a raw fuel gas by flowing a heating gas and a fuel gas through a heating gas passage and a heated gas passage, which are partitioned by a partition plate or the like, and transferring heat of the heating gas to the liquid fuel to evaporate the liquid fuel.

However, in the conventional evaporator of the heat exchanger type consisting of such a structure, since both ends of the partition plate are fixed, the partition plate thermally expands when used under a high-temperature environment. As a result, thermal stress is caused in portions where both the ends of the partition plate are fixed. In order to allow the partition plate to withstand this thermal stress, thickness of components to which the thermal stress is applied has to be increased to improve rigidity, which causes an increase in weight. In addition, since a heat capacity of the evaporator increases following the increase in weight, there is also a drawback in that a longer start-up time is required.

In addition, a method of using bellows or the like in order to relieve thermal stress is also possible. However, new problems occur in that the number of components is increased, the structure of the evaporator becomes complicated, and manufacturing costs are also increased.

SUMMARY OF THE INVENTION

Thus, it is an object of the present invention to provide a heat exchanger and an evaporator which are simple in structure, can relieve thermal stress, and has high durability.

In order to solve the problems, the present invention provides a heat exchanger which includes: a casing; an external cylinder which is arranged inside the casing with a clearance formed between the external cylinder and an inner surface of the casing and is supported in a cantilevered manner, has a closed end portion, and forms a first fluid passage between the external cylinder and the casing; and an internal cylinder which is arranged inside the external cylinder with a clearance formed between the internal cylinder and an inner surface of the external cylinder and is supported in a cantilevered manner, is open at both ends, and forms a second fluid passage, which is turned around at the end portion of the external cylinder, between the internal cylinder and the external cylinder.

According to the heat exchanger of such a structure, even if the external cylinder and the internal cylinder thermally expand when used under a high-temperature environment, the external cylinder and the internal cylinder can absorb thermal distortion by extending to the free-end sides thereof because these cylinders are cantilevered.

In the heat exchanger, one of the first fluid passage and the second fluid passage may be a heating fluid passage and the other may be a heated fluid passage.

In addition, in the heat exchanger, a fluid flowing inside the external cylinder may be made to flow turning around on the inside of the end portion of the external cylinder, and a fluid flowing outside the external cylinder may be made to flow along an axial direction of the external cylinder.

With such a structure, both the heating fluid and the heated fluid are allowed to flow along the axial direction of the external cylinder and the internal cylinder. Thus, a temperature distribution of the external cylinder and the internal cylinder in a direction perpendicular to the axial direction can be made substantially uniform.

In the heat exchanger, fluid passages may be formed between plural external cylinders.

With such a structure, heat radiation from a fluid flowing on the outside of the external cylinder can be controlled.

The heat exchanger may further include a fin provided on the outside of the external cylinder.

With such a structure, a heat transfer area of the external cylinder increases due to the existence of the fin, and heat transfer performance improves. In addition, since the fluid passage on the outside of the external cylinder is divided into smaller parts by the fin, in particular, in the case in which the fluid flowing on the outside of the external cylinder is a liquid, the liquid never flows only on the one side of the fluid passage.

The heat exchanger may further include plural projecting portions formed on an outer surface of the internal cylinder.

With such a structure, the clearance between the external cylinder and the internal cylinder can be maintained constant. In addition, a fluid flowing on the inside of the external cylinder can be agitated by the projected parts.

The heat exchanger may include a plurality of an external cylinder and an internal cylinder disposed in the external cylinder, and the external cylinders, each of which has a flattened cylindrical shape and is supported in a cantilevered manner such that an end thereof is fixed, may be coupled to each other at the ends thereof. Each of the internal cylinders may have a flattened cylindrical shape and may be supported in a cantilevered manner such that an end thereof, corresponding to the end of each of the external cylinders, is fixed.

With such a structure, since the external cylinder has the flattened cylindrical shape, it becomes possible to insert a fin, which is generally used in a heat exchanger, between adjacent external cylinders. In addition, by setting supporting sides of the external cylinder and the internal cylinder on the same side, the structure of the heat exchanger can be simplified.

The heat exchanger may further include an inlet port for a fluid flowing on the outside of the external cylinder provided at a free-end side of the external cylinder.

With such a structure, it becomes easy to flow the fluid along an axis of the external cylinder on the outside of the external cylinder.

In the heat exchanger, the external cylinders may include a corrugated plate formed by bending a single plate so as to be corrugated, and side plates closing both lateral sides of the corrugated plate.

With such a structure, it becomes easy to form the external cylinder in a flattened cylindrical shape.

In the heat exchanger, an inlet port for a fluid flowing outside the external cylinders may be disposed outside the external cylinders and close to sharply curved portions of the external cylinders.

With such a structure, it becomes possible to cause the fluid flowing on the outside of the external cylinder to flow in a direction crossing a fluid flowing on the inside of the external cylinder.

In the heat exchanger, both the external cylinder and the internal cylinder may be formed in a cylindrical shape, and a fluid passage with an annular cross-section may be formed around the external cylinder.

With such a structure, it becomes possible to use a commercially available pipe for the external cylinder and the internal cylinder.

Moreover, the present invention provides an evaporator which includes an evaporation unit having the above-described heat exchanger, wherein one of the first fluid passage and the second fluid passage is a heating fluid passage, and the other is a heated fluid passage, and wherein the heated fluid is a fluid fuel and vaporized fuel generated by vaporizing the fluid fuel, and the heating fluid is a heating gas.

According to the evaporator with such a structure, even if used under a high-temperature environment the external cylinder and the internal cylinder of the evaporation unit thermally expand, the external cylinder and the internal cylinder can absorb thermal distortion by extending to the free-end sides thereof because these cylinders are cantilevered.

The evaporator may further include a superheating unit which heats the vaporized fuel generated by the evaporation unit by heat exchange with the heating gas, and the superheating unit may include the above-described heat exchanger.

With such a structure, the vaporized fuel generated by the evaporation unit can be thermally exchanged with the heating gas in the superheating unit, and the temperature of the vaporized fuel can be further increased.

In the evaporator, the heating gas may be made to flow from the heating fluid passage of the evaporation unit to the heating fluid passage of the superheating unit.

With such a structure, both the vaporized fuel and the heating gas can be changed to parallel flows which flow from the evaporation unit to the superheating unit.

In the evaporator, the heating gas may be made to flow from a heating fluid passage of the superheating unit to a heating fluid passage of the evaporator.

With such a structure, the vaporized fuel flows from the evaporation unit to the superheating unit, and the heating gas flows from the superheating unit to the evaporation unit, that is, the vaporized fuel and the heating gas can be changed to a counter flow.

In the evaporator, a catalyst may be provided in the heating fluid passage of the heat exchanger constituting the evaporation unit.

With such a structure, a combustible substance in the heating gas to be supplied to the heating fluid passage of the evaporation unit can be subjected to catalytic combustion to increase the temperature of the heating gas.

In the evaporator, a catalyst may be provided in the heating fluid passage of the heat exchanger constituting the superheating unit.

With such a structure, a combustible substance in the heating gas flowing through the heating fluid passage of the superheating unit can be subjected to catalytic combustion to increase the temperature of the heating gas.

In the evaporator, the heating fluid passage may be formed on the inside of the external cylinder, and the catalyst may be provided on the inside of the internal cylinder.

With such a structure, it becomes possible to set the catalyst easily.

In the evaporator, the catalyst may be provided at a free-end side of the internal cylinder.

With such a structure, a supporting portion of the internal cylinder can be provided apart from a part heated by catalytic combustion.

The evaporator may further include a heat retaining unit disposed around the evaporation unit, and the heating gas, which is exhausted through the heating fluid passage of the evaporation unit, may be made to flow through the heat retaining unit.

With such a structure, heat of the evaporation unit can be retained using exhaust heat of the heating gas, and heat radiation from the evaporation unit can be controlled.

DETAILED DESCRIPTION OF THE PREFERRED EMBODIMENTS

Embodiments of a heat exchanger and an evaporator in accordance with the present invention will be hereinafter described with reference to FIGS. 1 to 19. Note that, in the respective embodiments described below, the heat exchanger and the evaporator are described in a form as an evaporator used in a fuel reforming system for a fuel cell, and the fuel reforming system generates a fuel gas to be supplied to the fuel cell.

First Embodiment

A first embodiment of the present invention will be described with reference to FIGS. 1 to 15E.

Figure 1:
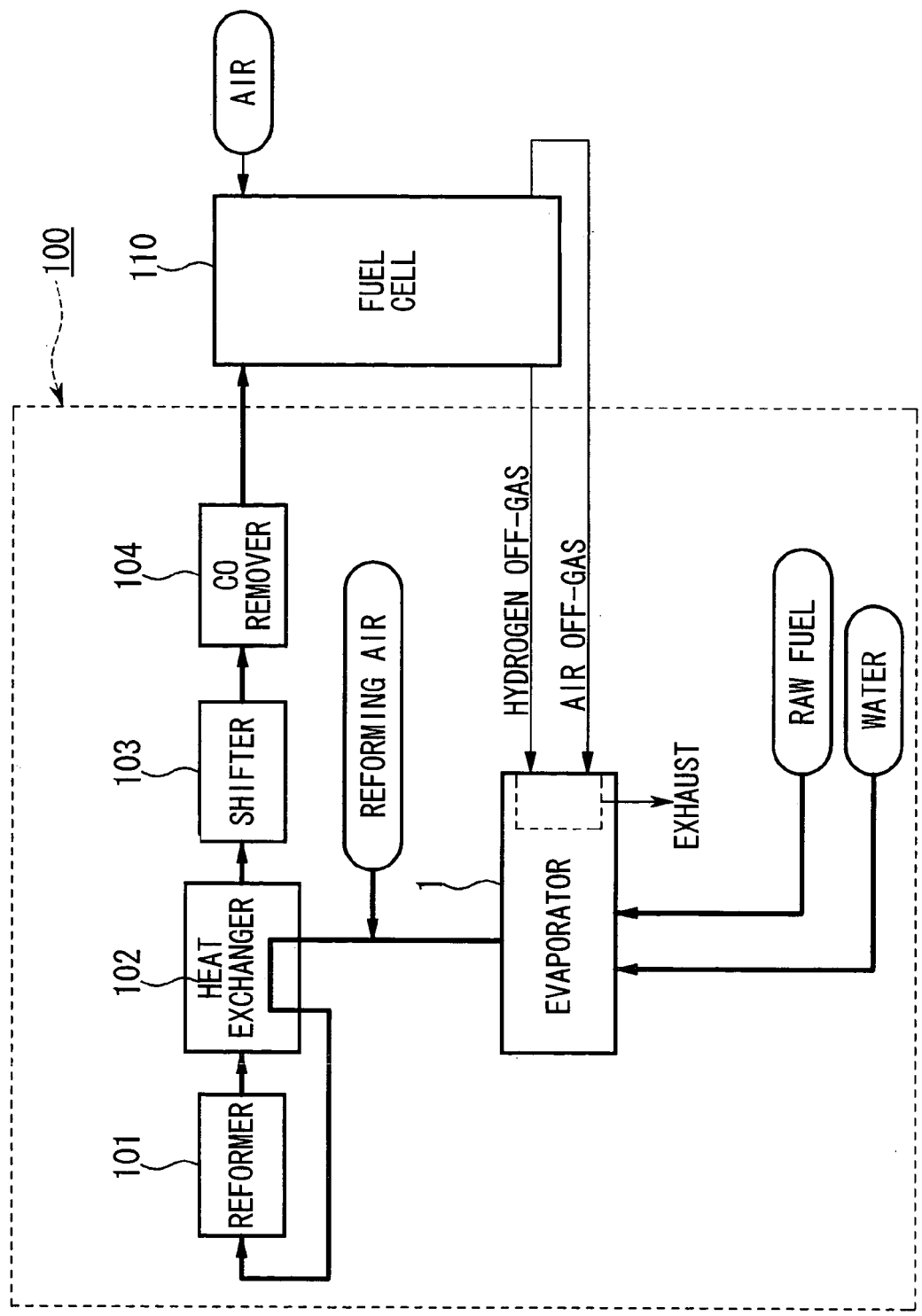
FIG. 1 is a schematic diagram of a fuel cell system in which an evaporator in accordance with the present invention is used.

First, a fuel reforming system for a fuel cell will be described briefly with reference to FIG. 1. A fuel reforming system 100 mainly includes an evaporator 1 which constitutes a characteristic part of the present invention, a reformer 101 of an auto-thermal type, a heat exchanger 102, a shifter 103, and a CO remover 104. The fuel reforming system 100 reforms a raw fuel containing hydrocarbons (e.g., gasoline or methanol) into a hydrogen-rich gas (hereinafter referred to as a hydrogen-rich gas) and supplies the hydrogen-rich gas to a fuel cell 110 as a fuel gas.

The fuel cell 110 is, for example, a fuel cell of a solid polymer electrolyte type. The fuel cell 110 performs power generation according to an electrochemical reaction of hydrogen in a fuel gas (hydrogen-rich gas), which is supplied from the fuel reforming system 100 to an anode, and oxygen in the air serving as an oxidizer gas, which is supplied to a cathode.

The evaporator 1 includes a heated fluid passage and a heating fluid passage. A raw fuel and water are supplied to the heated fluid passage as a liquid fuel (heated fluid), and a hydrogen off-gas and an air off-gas (hereinafter generally referred to as an off-gas), which are exhausted from the fuel cell 100, are supplied to the heating fluid passage as a heating gas (heating fluid). Hydrogen contained in the heating gas is subjected to catalytic combustion in the evaporator 1, whereby the temperature of the heating gas rises. Then, this high-temperature heating gas and the liquid fuel exchange heat, whereby the liquid fuel is vaporized and vaporized fuel is generated.

The vaporized fuel generated by the evaporator 1 is mixed with a reforming air to be changed to a raw material gas and is heated by the heat exchanger 102 to be supplied to the reformer 101. Note that the reforming air may be supplied to the evaporator 1 together with the liquid fuel.

The reformer 101 includes a reforming catalyst. Partial oxidation and vapor reforming are performed in the reformer 101 according to a catalytic action of this reforming catalyst. As a result, the raw material gas is reformed into a hydrogen-rich reformed gas. The reformed gas exhausted from the reformer 101 exchanges heat with the raw material gas in the heat exchanger 102, and is cooled and supplied to the shifter 103.

The shifter 103 includes a shift catalyst. A shift reaction is caused inside the shifter 103 by a catalytic action of this shift catalyst, and a large quantity of CO in the reformed gas is transformed into $H_2$ and $CO_2$.

The reformed gas exhausted from the shifter 103 is supplied to the CO remover 104. The CO remover 104 includes a CO removing catalyst for selectively oxidizing CO. A very small amount of CO remaining in the reformed gas is oxidized to be carbon dioxide ($CO_2$) according to a catalytic action of this CO removing catalyst.

The reformed gas with CO removed in this way is supplied to the anode of the fuel cell 110 as a hydrogen-rich gas (fuel gas).

Next, the evaporator 1 will be described in detail with reference to FIGS. 2 to 15E.

Figure 2:
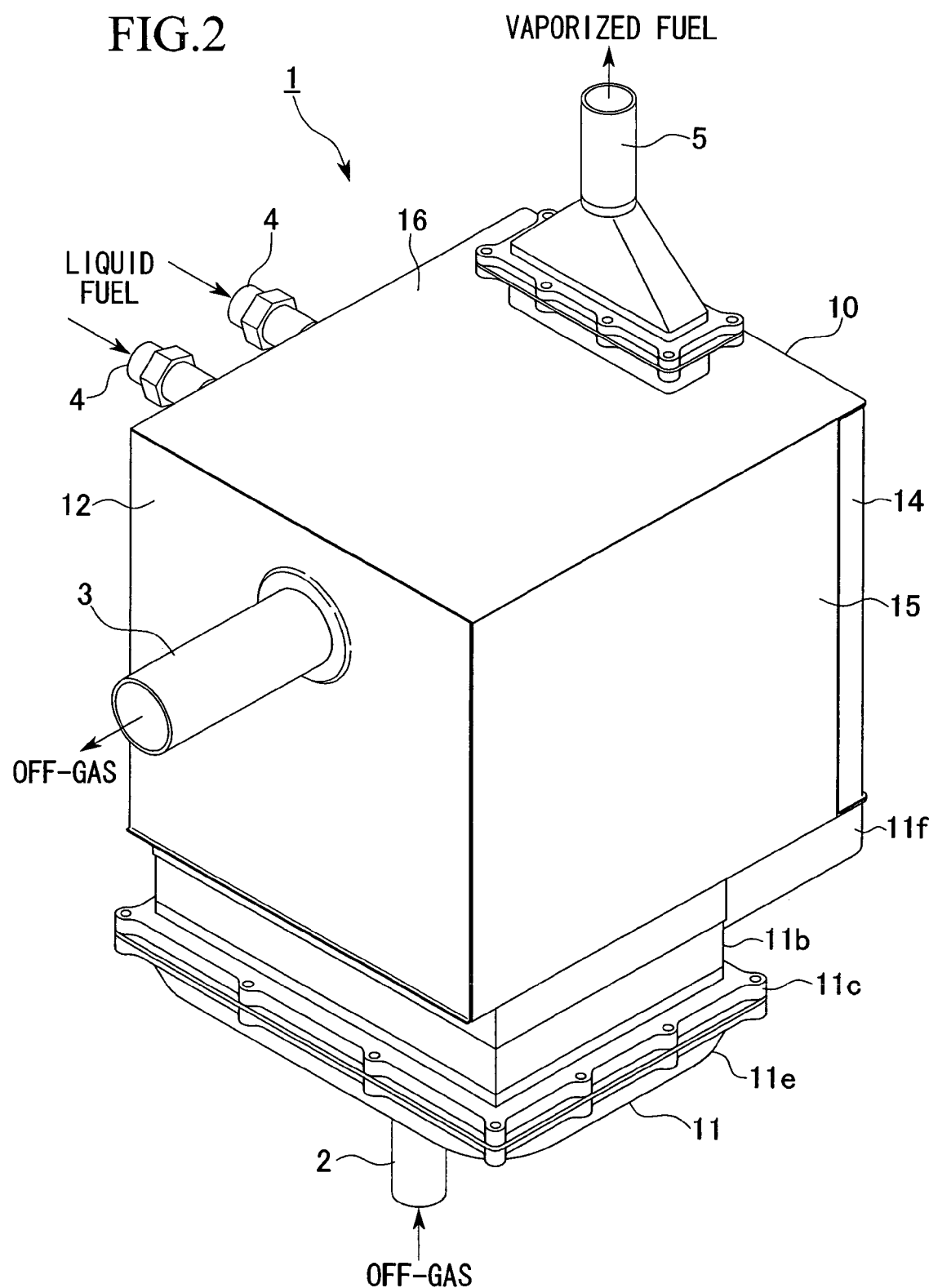
FIG. 2 is an external perspective view in a first embodiment of the evaporator in accordance with the present invention.
Figure 3:
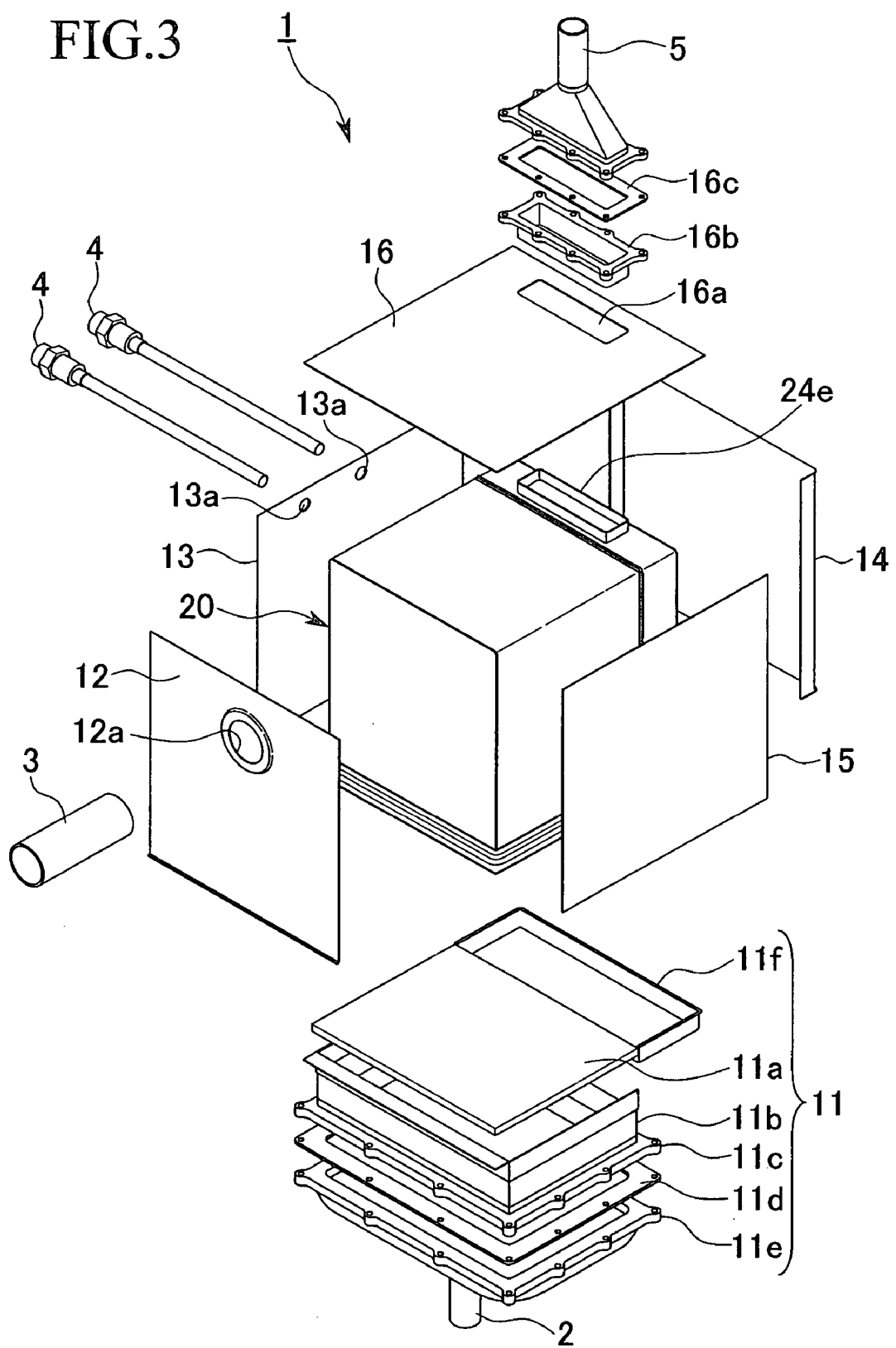
FIG. 3 is a disassembled perspective view of the evaporator.
Figure 4:
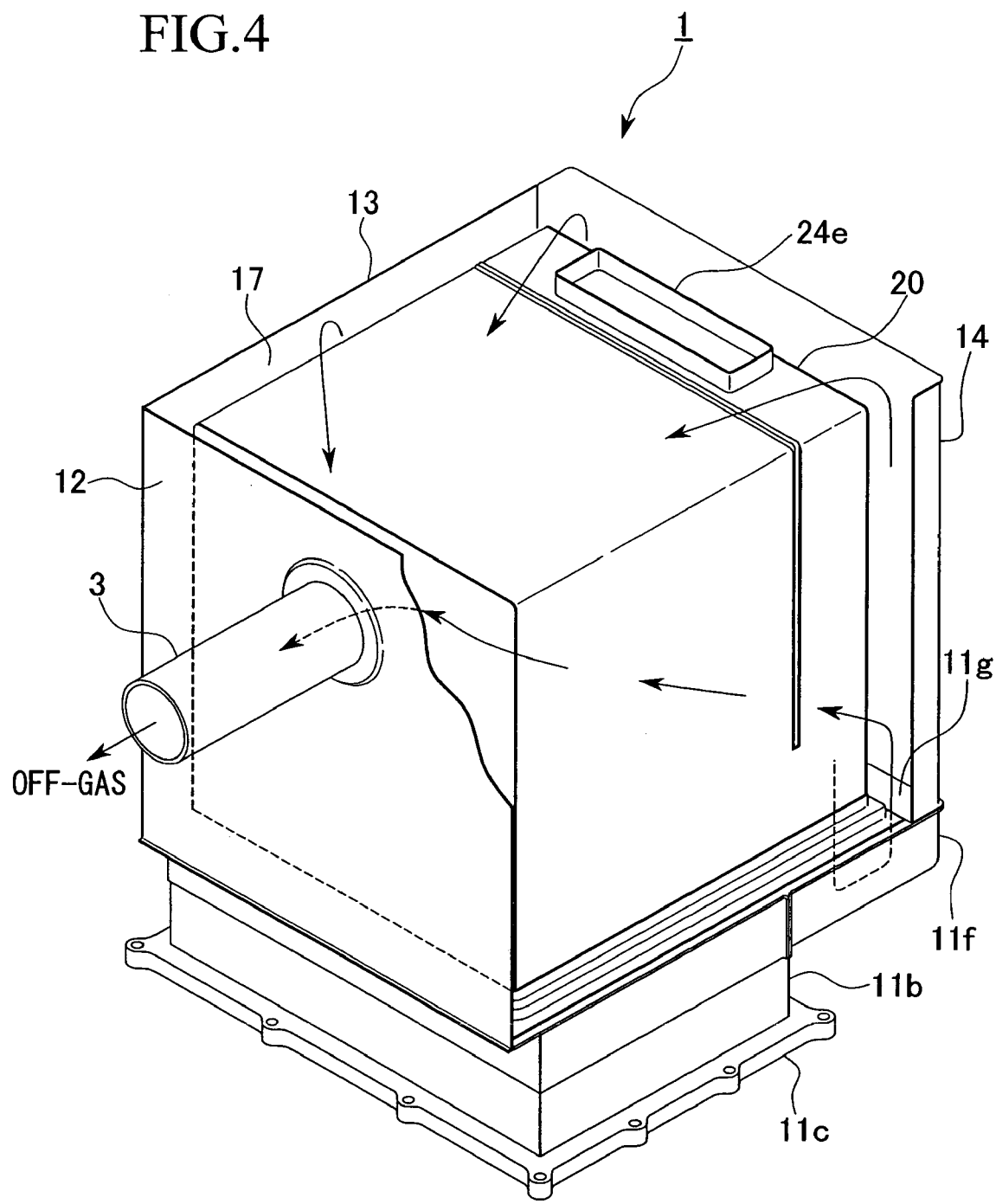
FIG. 4 is a perspective view showing the evaporator with a part of an outer plate thereof removed.

FIG. 2 is an external perspective view of the evaporator 1, FIG. 3 is a disassembled perspective view of the same, and FIG. 4 is a perspective view showing the evaporator 11 with a part of an outer plate thereof removed.

The evaporator 1 includes a closed housing 10 of a rectangular box shape. A heating fluid inlet pipe 2 is provided at a bottom 11 of this housing 10, a heating fluid outlet pipe 3 is provided in a side plate 12, two fluid fuel nozzles 4 and 4 are provided in a side plate 13, and a vaporized fuel outlet pipe 5 is provided in a top plate 16.

The bottom 11 of the housing 10 includes: a filter case 11b which houses a filter 11a; a heating fluid inlet cover 11e which is coupled to a bottom flange 11c of the filter case 11b via a gasket 11d; and a heating fluid receiving box 11f which is arranged on substantially the same plane as the filter 11a and coupled to the filter case 11b. The heating fluid inlet pipe 2 is coupled and fixed to the heating fluid inlet cover 11e. Since the heating fluid receiving box 11f is opened in an upper part thereof, a gas is made unable to flow between the heating fluid receiving box 11f and the filter 11a and the filter case 11b.

The heating fluid outlet pipe 3 is coupled and fixed to a heating fluid outlet hole 12a of the side plate 12.

Both the two liquid fuel nozzles 4 and 4 extend axial lines thereof horizontally and are arranged at the same height in parallel with each other. Base ends of the liquid fuel nozzles 4 are projected to the outside from the side plate 13, and tip sides thereof are inserted into the housing 10 from holes 13a and 13a of the side plate 13.

The vaporized fuel outlet pipe 5 is coupled to a flange portion 16b, which is coupled and fixed to a vaporized fuel outlet hole 16a of the top plate 16, via a gasket 16c.

A heat exchange unit 20 is housed inside this housing 10. The heat exchange unit 20 is formed in a rectangular box shape. The heat exchange unit 20 is set with the bottom thereof coupled on the filter case 11b and the heating fluid receiving box 11f and is set with a predetermined clearance between the heat exchange unit 20 and the four side plates 12, 13, 14 and 15 and the top plate 16 of the housing 10. This clearance forms a heat retaining chamber (heat retaining unit) 17 through which the heated gas flows. In addition, since the predetermined clearance is provided between the heat exchange unit 20 and the side plate 14, as shown in FIG. 4, an opening 11g is formed on the side plate 14 side of the heating fluid receiving box 11f, and the inside of the heating fluid receiving box 11f and the heat retaining chamber 17 communicate with each other via this opening 11g. The heating fluid outlet pipe 3 provided on the side plate 12 communicates with this heat retaining chamber 17.

Figure 5:
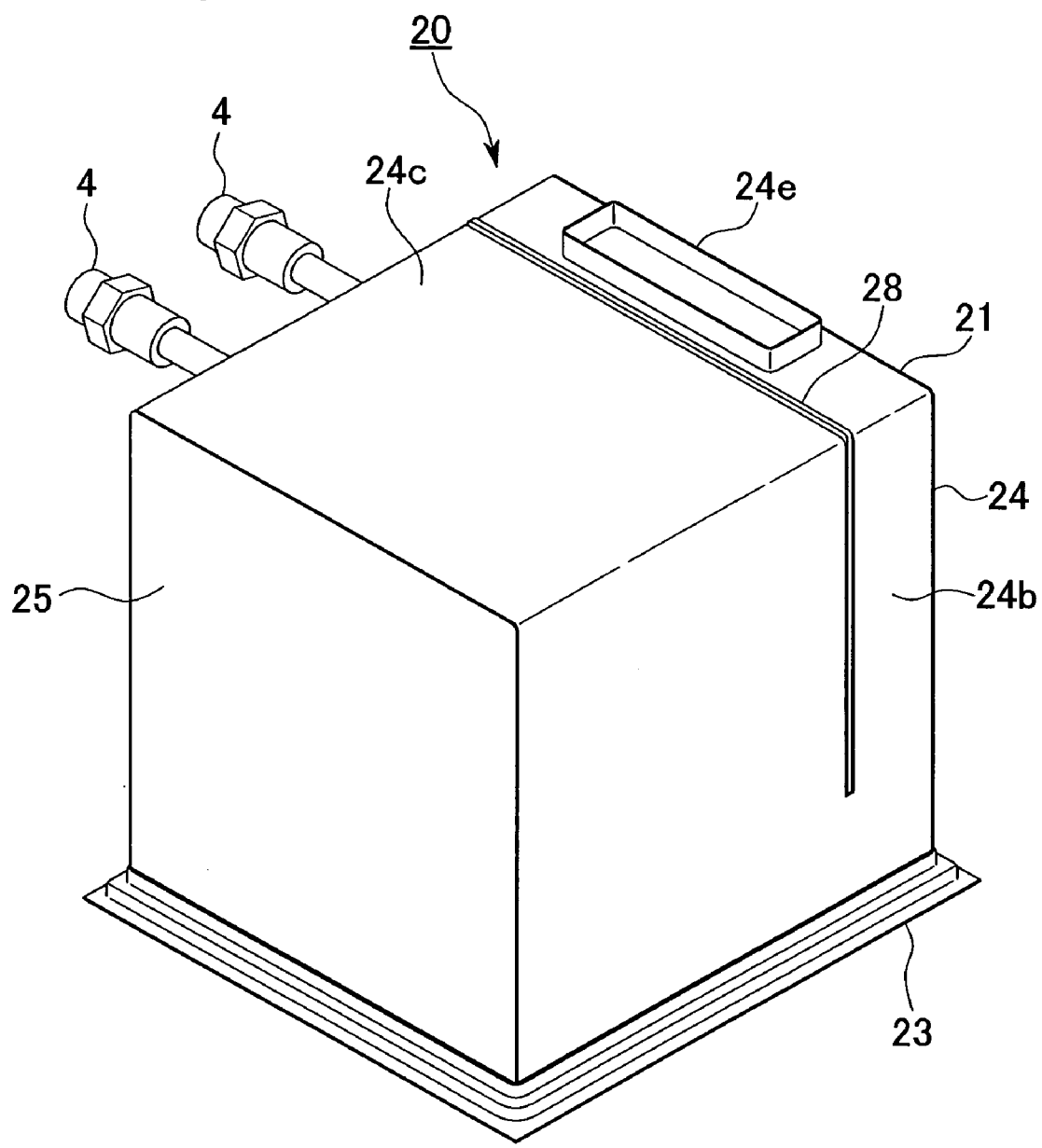
FIG. 5 is an external perspective view of a heat exchange unit of the evaporator.
Figure 6:
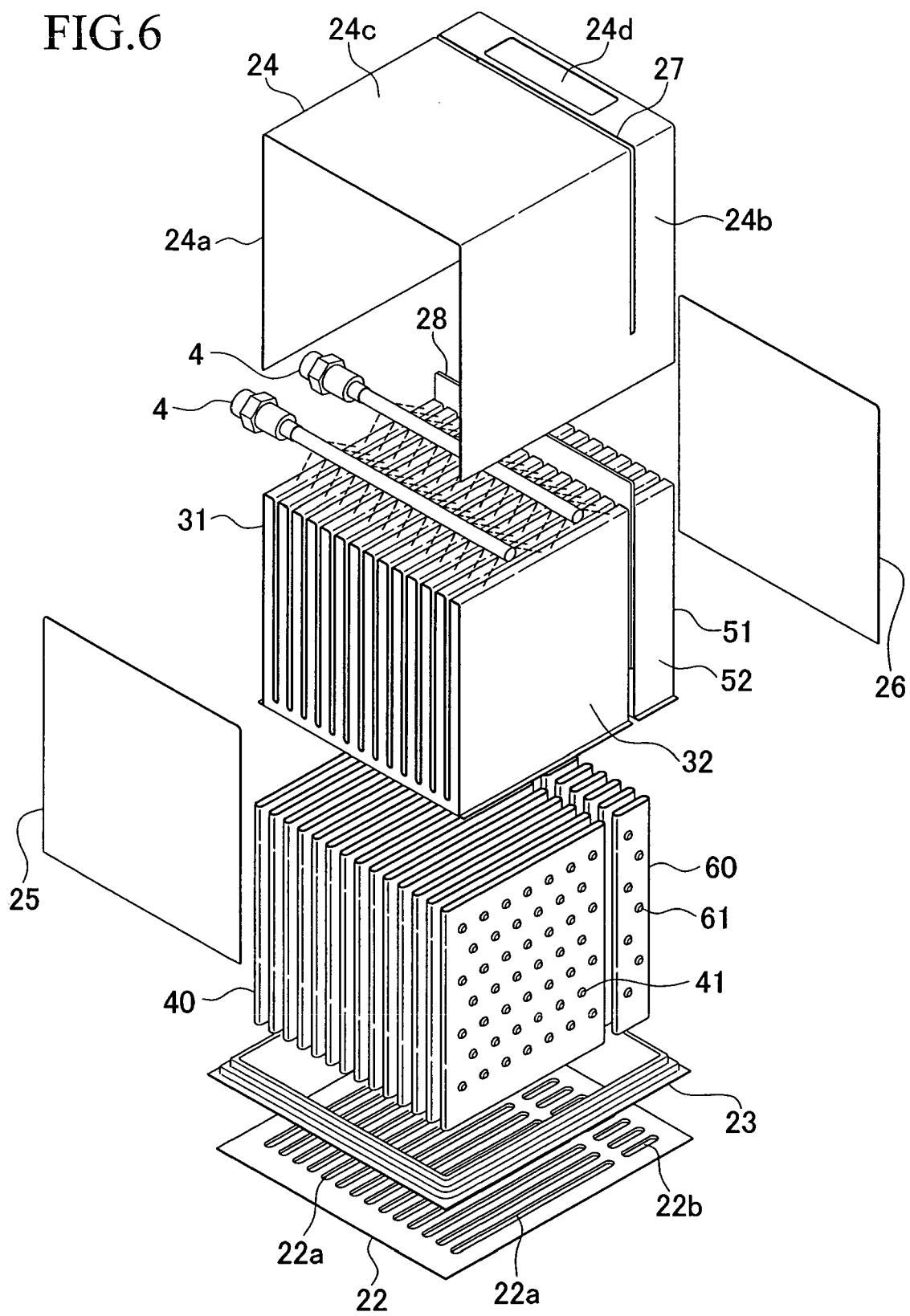
FIG. 6 is a disassembled perspective view of the heat exchange unit.
Figure 7:
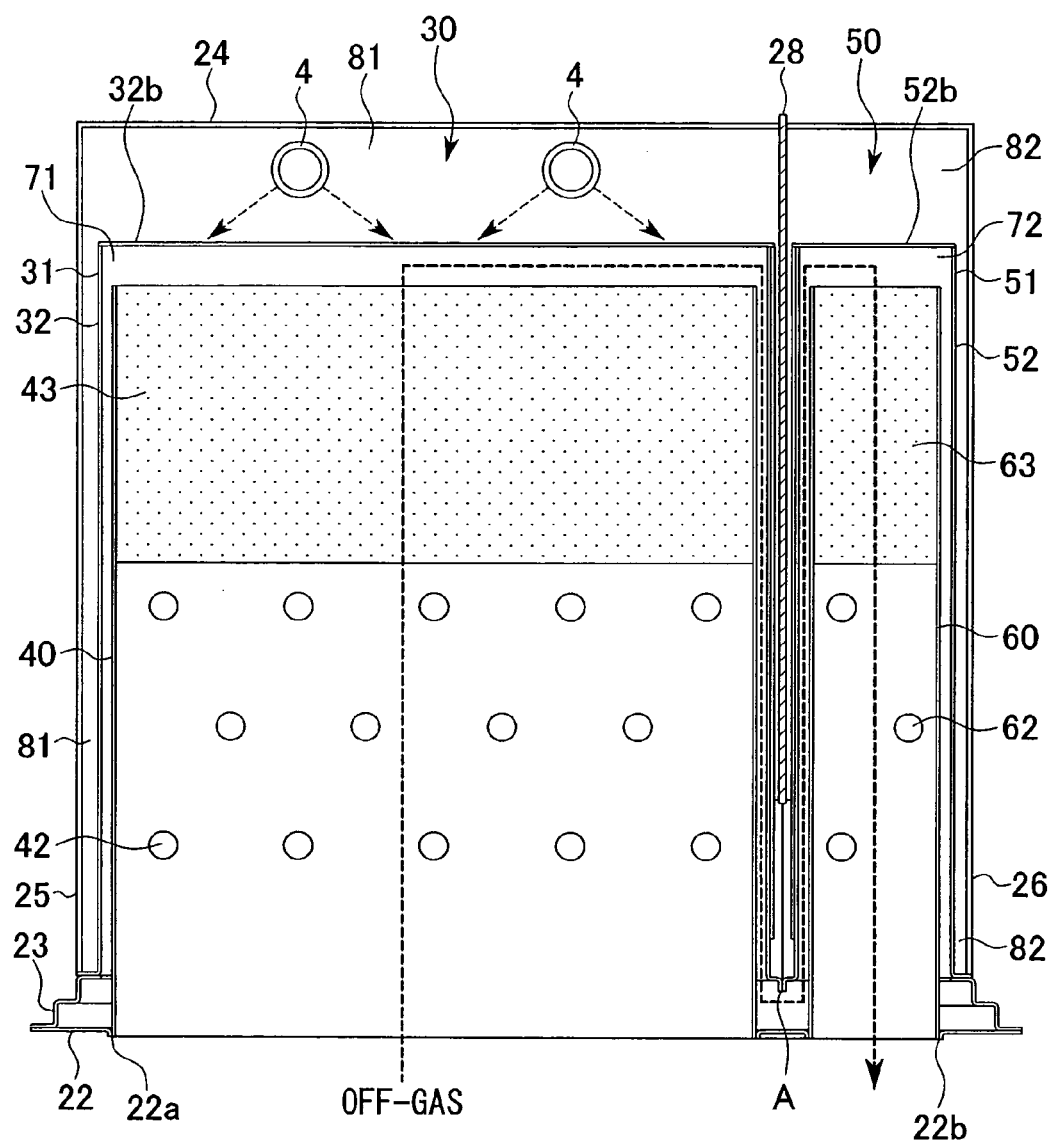
FIG. 7 is a longitudinal sectional view of the heat exchange unit.
Figure 8:
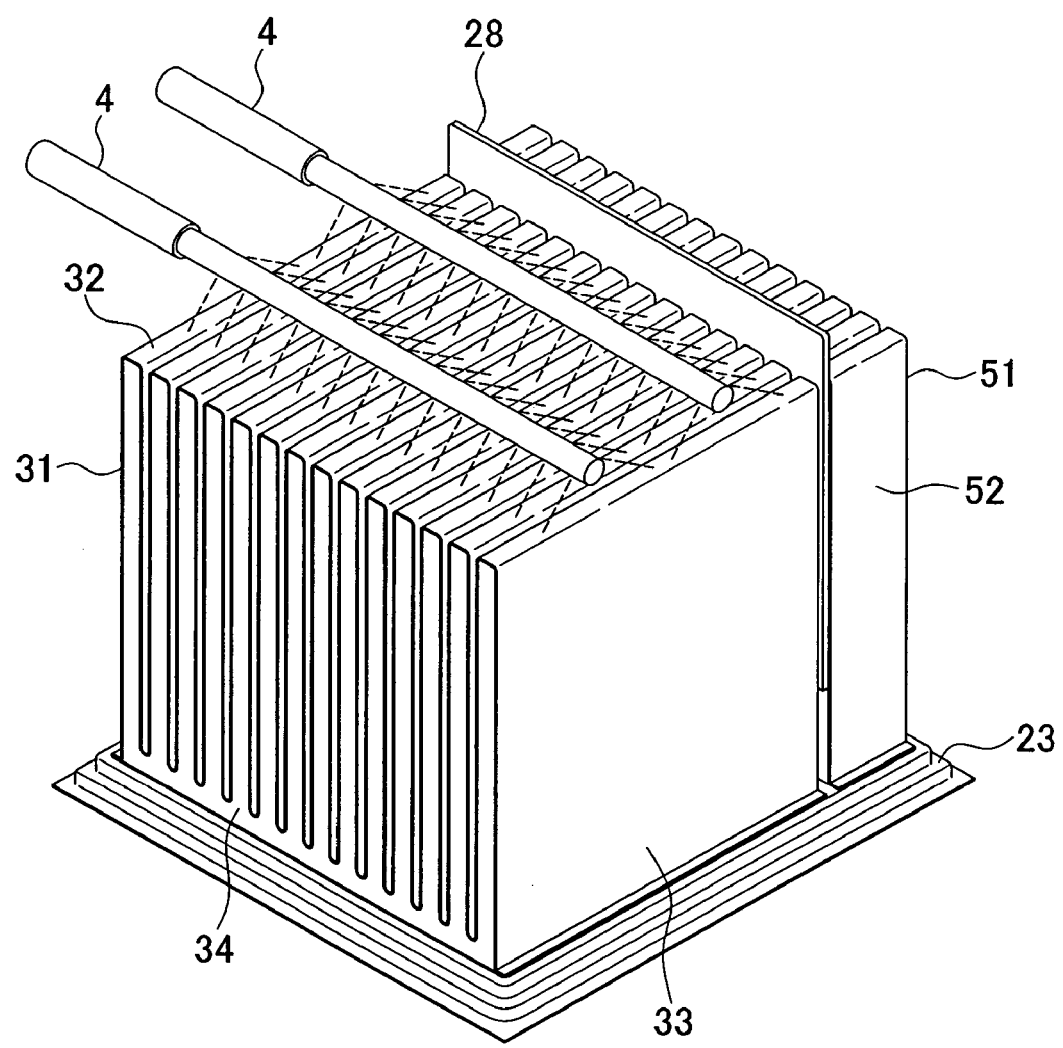
FIG. 8 is a perspective view showing the inside of the heat exchange unit.

FIG. 5 is an external perspective view of the heat exchange unit 20, FIG. 6 is a disassembled perspective view thereof, FIG. 7 is a longitudinal sectional view thereof, and FIG. 8 is a perspective view showing the inside of the heat exchange unit 20.

The heat exchange unit 20 includes a casing 21 of a rectangular box shape. The casing 21 has a bottom plate 22, a stepped skirt 23, a shell plate 24 formed by bending a plate material in a C shape, and two side plates 25 and 26. The bottom plate 22 is joined to the bottom of the skirt 23, a lower opening of the skirt 23 is closed, side plate portions 24a and 24b of the shell plate 24 are joined to the upper end of the skirt 23, and the side plates 25 and 26 are joined to the upper part of the skirt 23 and the shell plate 24, whereby a closed space is formed inside the casing 21.

A cut groove 27 is provided from a top plate portion 24c to the middle of both the side plate portions 24a and 24b in the shell plate 24. The inside space of the casing 21 is sectioned into an evaporation unit 30 and a superheating unit 50 by a partitioning plate 28 inserted in and fixed to this cut groove 27. Note that a capacity of the evaporation unit 30 is set larger than a capacity of the superheating unit 50. Both the evaporation unit 30 and the superheating unit 50 are constituted by a heat exchanger and have completely the same structure.

Figure 9:
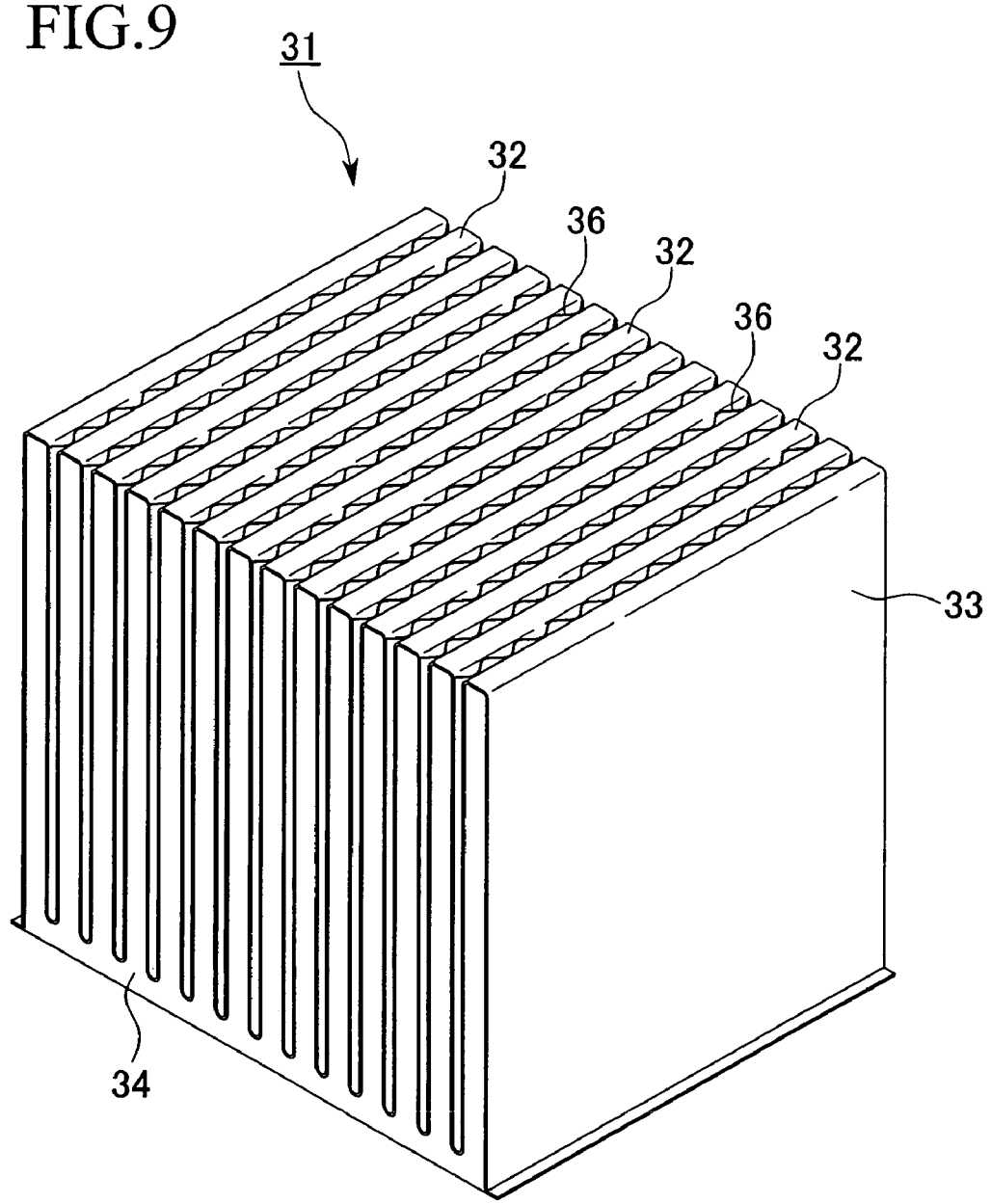
FIG. 9 is an external perspective view of an evaporation unit of the heat exchange unit.

The evaporation unit 30 includes an external cylinder assembly 31, which partitions a heating fluid passage and a heated fluid passage, and a large number of internal cylinders 40, which are inserted into the inside of the external cylinder assembly 31. As shown in FIG. 9, the external cylinder assembly 31 includes a bent plate 33, which is formed by bending one metal plate in a comb-teeth shape, and two side plates 34, which are joined to openings of a comb-teeth shape formed on both sides of the bent plate 33 and close the openings. In other words, the external cylinder assembly 31 has a form in which a large number of external cylinders 32 of a flattened cylindrical shape with tips thereof closed are arranged at a fixed interval, and base ends side of all the external cylinders 32 are coupled.

Figure 12:
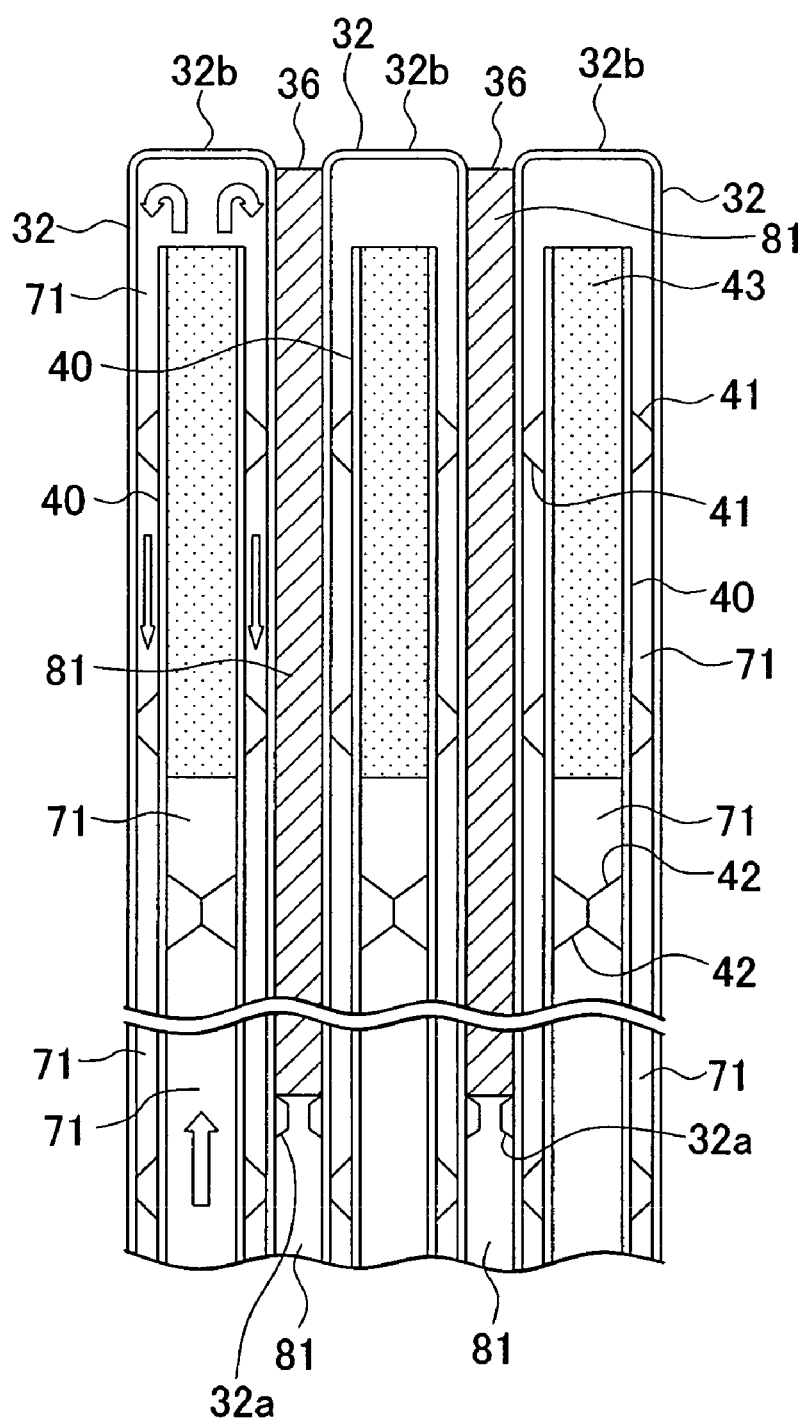
FIG. 12 is a longitudinal sectional view showing a principal part of the evaporation unit in an enlarged state.

In this external cylinder assembly 31, a fin 36 with a section of substantially a triangular corrugated shape are fixed in a clearance between the adjacent external cylinders 32 with projecting portions thereof extending in an axial direction of the external cylinders 32. As shown in FIG. 12, the fin 36 is locked and positioned by projected portions 32a, which project on lower outer surfaces of the external cylinders 32, at lower ends thereof, and are fixed with projecting portions thereof in contact with the outer surfaces of the external cylinders 32.

Figure 10:
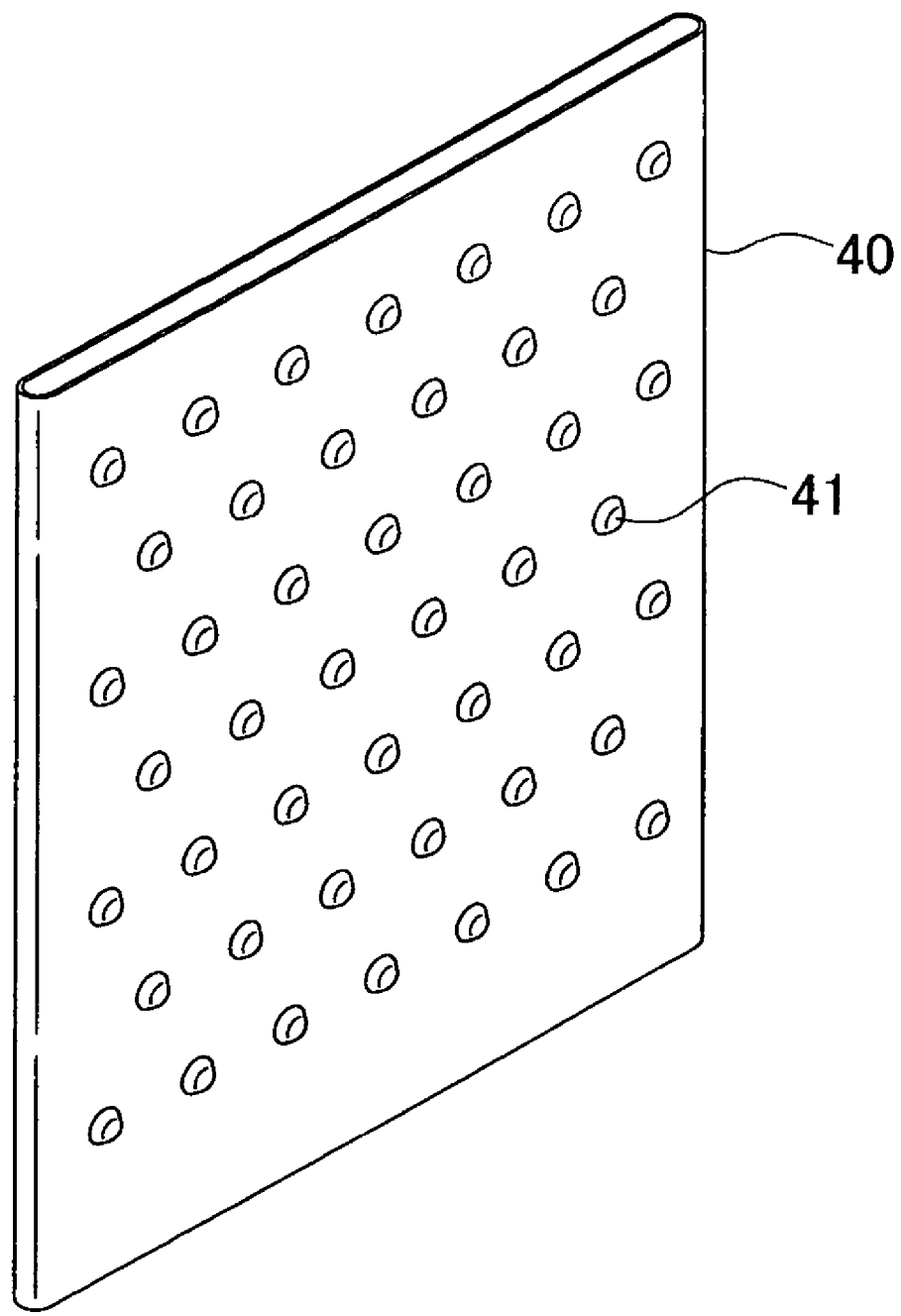
FIG. 10 is an external perspective view of an internal cylinder used in the evaporation unit.

As shown in FIG. 10, the internal cylinder 40 is formed in a flattened cylindrical shape and is opened at both ends in an axial direction. As shown in FIG. 12, the internal cylinder 40 includes a large number of outer projections 41 projecting to the outside and a large number of inner projections 42 projecting to the inside. The outer projections 41 are uniformly distributed and arranged substantially over the entire area of the outer surface of the internal cylinder 40, and the inner projections 42 are uniformly distributed and arranged substantially over the entire area of the outer surface of the internal cylinder 40. In addition, the inner projections 42 are arranged to be opposed to each other in the internal cylinder 40, and the opposed inner projections 42 are abutted against each other.

Figure 13:
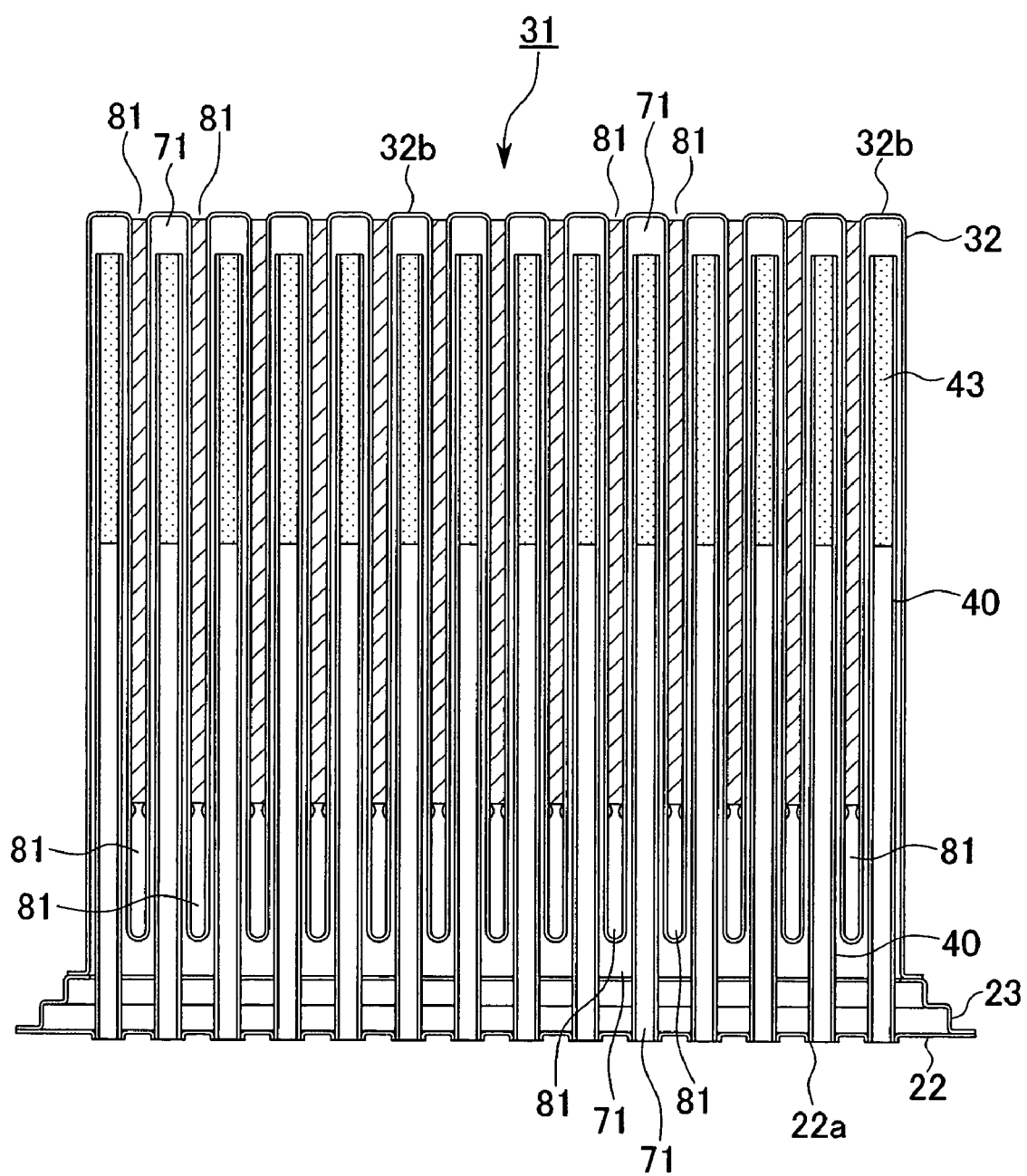
FIG. 13 is a longitudinal sectional view of the evaporation unit.

In the internal cylinder 40, as shown in FIGS. 7, 12 and 13, a catalyst layer 43, which is formed with, for example, a Pt oxidation catalyst carried on a honeycomb carrier, is provided in a tip portion where the inner projections 42 are not provided.

Furthermore, one internal cylinder 40 is inserted in each external cylinder 32 of the external cylinder assembly 31 such that the outer projections 41 of the internal cylinder 40 is in abutment with the inner surface of the external cylinder 32 in an inserted state, whereby the clearance between the internal cylinder 40 and the external cylinder 31 is maintained constant.

The superheating unit 50 is constituted in the same manner. As shown in FIGS. 6, 7 and 8, the superheating unit 50 includes an external cylinder assembly 51, which is formed by joining side plates in openings on both sides of a bent plate and has a large number of external cylinders 52, and an internal cylinder 60 of a flattened cylindrical shape opened at both ends, which is inserted in each external cylinder 52. In the internal cylinder 60, outer projections 61 and inner projections 62 are provided and a catalyst layer 63 is also provided. In this catalyst layer 63, a purification catalyst (Pt, Pd, Rh, etc.) preferable for emission purification for carbon monoxide (CO) or the like is carried. Note that, although not shown in the figure, in the superheating unit 50, a fin is also provided between adjacent external cylinders 52 and 52, and projections for positioning of the fin are provided on the lower outer surface of the external cylinders 52.

Furthermore, both the external cylinder assembly 31 of the evaporation unit 30 and the external cylinder assembly 51 of the superheating unit 50 are arranged with axial directions of the external cylinders 32 and 52 set in the vertical direction (gravity direction). As a result, the external cylinder assembly 31 of the evaporation unit 30 and the external cylinder assembly 51 of the superheating unit 50 are arranged with the projecting portions of the fin 36 in the evaporation unit 30 and the fin of the superheating unit 50 also extending in the vertical direction (gravity direction). In addition, the external cylinder assembly 31 of the evaporation unit 30 and the external cylinder assembly 51 of the superheating unit 50 are arranged with the above-described partition plate 28 nipped between them with a direction, in which the external cylinders 32 are adjacent to each other, and a direction, in which the external cylinders 52 are adjacent to each other, set in an identical direction. Furthermore, as shown in FIG. 7, lower ends on a side, where the external cylinder assembly 31 and the external cylinder assembly 51 are adjacent to each other, are joined with each other, and a lower end of the partition plate 28 is fixed in a position apart from this connecting portion A upwards by a predetermined length.

The external cylinder assembly 31 of the evaporation unit 30 and the external cylinder assembly 51 of the superheating unit 50 are joined to the skirt 23 of the casing 21, and the internal cylinders 40 are joined to the bottom plate 22.

More specifically, as shown in FIG. 6, in the bottom plate 22, a large number of oblong holes 22a, in which the internal cylinders 40 of the evaporation unit 30 are inserted, are provided in parallel with each other at a predetermined interval in an area where the housing 10 is coupled to the filter case 11b, and a large number of oblong holes 22b, in which the internal cylinders 60 of the superheating unit 50 are inserted, are provided in parallel with each other in an area where the housing 10 is coupled to the heating fluid receiving box 11f. Note that periphery forming portions of these holes 22a and 22b are raised to the outside.

In addition, as shown in FIGS. 7 and 13, the respective cylinders 40 of the evaporation unit 30 are inserted in the holes 22a of the bottom plate 22 at base ends thereof through the inside of the skirt 23 and are fixed to the periphery forming portions of the holes 22a by bar rings. Furthermore, the external cylinder assembly 31 of the evaporation unit 30 is covered over the internal cylinders 40 such that the respective internal cylinders 40 are inserted in the corresponding external cylinders 32, and the lower end (base end) of the external assembly 31 is joined and fixed to the upper end of the skirt 23. In a state in which the external cylinder assembly 31 and the internal cylinders 40 are fixed in this way, the tips of the internal cylinders 40 are apart from tip closing portions 32b of the external cylinders 32 by a predetermined length.

Figure 11:
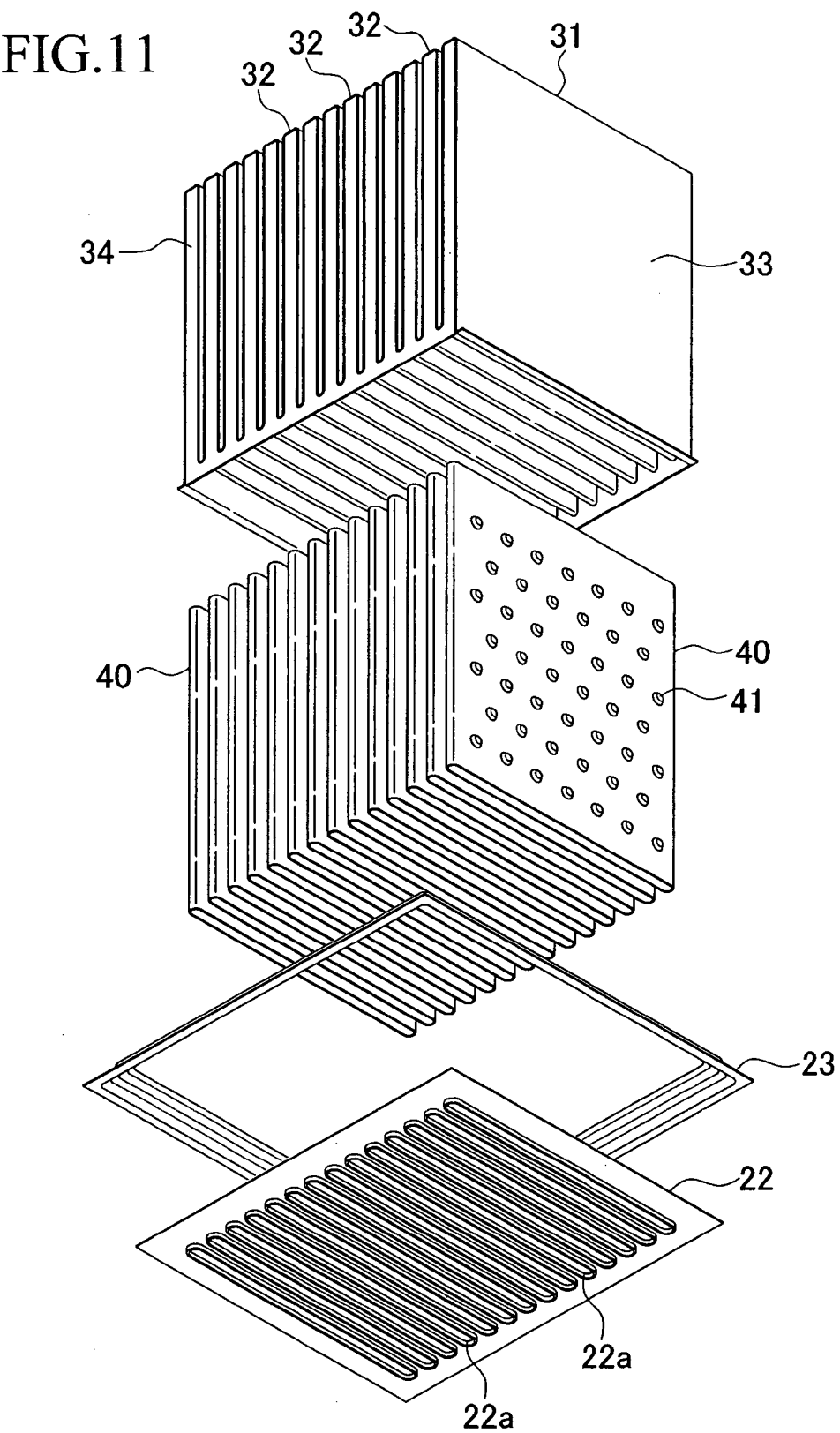
FIG. 11 is a disassembled perspective view of the evaporation unit of the heat exchange unit viewed from the bottom.

Note that, although FIG. 11 is a disassembled perspective view of the evaporation unit 30 viewed from the bottom, portions to which the superheating unit 50 corresponds in the bottom plate 22 and the skirt 23 are not shown in this figure.

The above-description is applied to the superheating unit 50 as well. The respective cylinders 60 of the superheating unit 50 are inserted in the holes 22b of the bottom plate 22 at base ends thereof through the inside of the skirt 23 and are fixed to the periphery forming portions of the holes 22a by bar rings. Furthermore, the external cylinder assembly 51 of the superheating unit 30 is covered over the internal cylinders 60 such that the respective internal cylinders 60 are inserted in the corresponding external cylinders 52, and the lower end (base end) of the external assembly 51 is joined and fixed to the upper end of the skirt 23. In a state in which the external cylinder assembly 51 and the internal cylinders 60 are fixed in this way, the tips of the internal cylinders 60 are apart from tip closing portions 52b of the external cylinders 52 by a predetermined length.

In other words, in the evaporation unit 30, the respective external cylinders 32 are cantilevered at the base ends thereof and form free ends at the tip sides thereof. In addition, in the superheating unit 50, the respective external cylinders 52 are cantilevered at the base ends thereof and form free ends at the tip sides thereof, and the respective internal cylinders 60 are cantilevered at the base ends thereof and form free ends at the tip sides thereof. Therefore, even in the case in which the external cylinder assemblies 31 and 51 and the internal cylinders 40 and 60 thermally expand due to heat applied to them, since the respective external cylinders 32 and 52 and the respective internal cylinders 40 and 60 extend to the tip sides, thermal stress is not caused.

The external cylinder assemblies 31 and 51 are fixed to the skirt 23, and the partition plate 28 is fixed between both the external cylinder assemblies 31 and 51 in this way. Then, the shell plate 24 of the casing 21 is covered over the external cylinder assemblies 31 and 51. At this point, the partition plate 28 is fit in the cut groove 27 of the shell plate 24. Moreover, the partition plate 28 is joined to the shell plate 24 in the cut groove 27, whereby the cut groove 27 is closed.

In addition, in the evaporation unit 30, tip sides of the liquid fuel nozzles 4 are inserted between the top plate portion 24c of the shell plate 24 of the casing 21 and the external cylinder assembly 31 piercing through the side plate portions 24a of the shell plate 24. Here, the liquid fuel nozzles 4 are arranged with an axial direction thereof set in the same direction as the direction in which the external cylinders 32 are adjacent to each other in the external cylinder assembly 31.

On the other hand, as shown in FIG. 6, a vaporized fuel outlet hole 24d is formed in the top plate portion 24c corresponding to the superheating unit 50 in the casing 21. As shown in FIG. 5, a cylinder 24e is joined to this vaporized fuel outlet hole 24d. As shown in FIG. 3, this cylinder 24e is connected to the vaporized fuel outlet hole 16a of the top plate 16 in the housing 10.

In the heat exchange unit 20 constituted as described above, the inside of the external cylinder assemblies 31 and 51 forms a heating fluid passage, and the outside of the external cylinder assemblies 31 and 51 forms a heated fluid passage.

More specifically, as shown in FIG. 7 (see also FIGS. 12 and 13 concerning the evaporation unit 30) as well, a heating fluid passage 71, which turns around from the inside to the outside of the internal cylinder 40 at the inner tip of each external cylinder 32, is formed inside the external cylinder assembly 31 of the evaporation unit 30, and a heating fluid passage 72, which turns around from the outside to the inside of the internal cylinder 60 at the inner tip of each external cylinder 52, is formed inside the external cylinder assembly 51 of the superheating unit 50. Furthermore, an upstream end of the heating fluid passage 71 (i.e., a base end periphery of the internal cylinder 40) and an upstream end of the heating fluid passage 72 (i.e., a base end periphery of the internal cylinder 60) communicate with each other inside the skirt 23.

Note that the base end of each internal cylinder 40 of the evaporation unit 30 communicates with the heating fluid inlet pipe 2 via the filter 11a, the filter case 11b, and the heating fluid inlet cover 11e. The base end of each internal cylinder 60 of the superheating unit 50 communicates with an inner space of the heating fluid receiving box 11f.

On the other hand, a space, which is formed between the adjacent external cylinders 32 and 32 on the outside of the external cylinder assembly 31, constitutes a heated fluid passage 81 in the evaporation unit 30, and a space, which is formed between the adjacent external cylinders 52 and 52 on the outside of the external cylinder assembly 51, constitutes a heated fluid passage 82 of the superheating unit 50. As shown in FIG. 7, these heated fluid passages 81 and 82 communicate with each other through a space between the lower end of the partition plate 28 and the connecting portion A of the external cylinder assemblies 31 and 51.

Since the heating fluid passages 71 and 72 and the heated fluid passages 81 and 82 are formed in this way, it can be said that the heated fluid passage 81 of the evaporation unit 30 is generally surrounded by the external cylinders 32, and the heated fluid passage 82 of the superheating unit 50 is generally surrounded by the external cylinders 52 of the superheating unit 50. In other words, the heated fluid passage 81 of the evaporation unit 30 is generally surrounded by the heating fluid passage 71 of the evaporation unit 30, and the heated fluid passage 82 of the superheating unit 50 is generally surrounded by the heating fluid passage 72 of the superheating unit 50.

In the evaporator 1 constituted as described above, an off-gas exhausted from the fuel cell 110 is supplied to the heated fluid inlet pipe 2 as a heating gas, and a liquid fuel as a heated fluid is supplied to the liquid fuel nozzles 4.

First, a flow of the heating gas will be described. The heating gas supplied to the heating fluid inlet pipe 2 is filtered by the filter 11a, and then flows in each internal cylinder 40 of the evaporation unit 30 and flows through the heating fluid passage 71. The heating gas, having flowed in each internal cylinder 40, flows upwards in the gravity direction along the axial direction in the internal cylinder 40. When the heating gas passes through the catalyst layer 43, hydrogen in the heating gas is combusted, and the heating gas changes to a high-temperature heating gas. Then, when the heating gas passes through the catalyst layer 43 and is exhausted from the tip of the internal cylinder 40, the heating gas bumps against the tip closing portion 32b of the external cylinder 32 to reverse a direction of flow by 180 degrees and moves around to the outside of the internal cylinder 40, flows downwards in the gravity direction along the axial direction of the internal cylinder 40 between the external cylinder 32 and the internal cylinder 40, and flows in the space between the skirt 23 and the bottom plate 22. Then, when the high-temperature heating gas flows downwards in the gravity direction on the outside of the internal cylinder 40, a part of the heat of the heating gas is transferred to the external cylinder 32 and is further transferred to the fin 36 arranged between the external cylinders 32.

Here, since the large number of inner projections 24 are distributed and arranged inside the internal cylinder 40, until the heating gas flowing through the heating fluid passage 71 on the inside of the internal cylinder 40 reaches the catalyst layer 43, an air off-gas and a hydrogen off-gas constituting the heating gas are sufficiently mixed by the inner projections 42 to make a combustion state of the heating gas in the catalyst layer 43 satisfactory.

In addition, since the large number of outer projections 41 are distributed and arranged between the external cylinder 32 and the internal cylinder 40, the high-temperature heating gas is sufficiently agitated by the outer projections 41 while the heating gas flows through the heating fluid passage 71 between the external cylinder 32 and the internal cylinder 40, whereby heat transfer performance is improved.

Moreover, the heating gas, having flowed in the space between the skirt 23 and the bottom plate 22, flows through the heating fluid passage 72 of the superheating unit 50. In other words, the heating gas flows in the space between the external cylinder 52 and the internal cylinder 60 of the superheating unit 50 from the space between the skirt 23 and the bottom plate 22, and flows upwards in the gravity direction along the axial direction of the internal cylinder 60 in the space between the external cylinder 52 and the internal cylinder 60. Then, the heating gas bumps against the tip closing portion 52b of the external cylinder 52 to reverse a direction of flow by 180 degrees and moves around to the inside of the internal cylinder 60, flows downwards in the gravity direction along the axial direction in the internal cylinder 60 through the catalyst layer 63, and flows out to the heating fluid receiving box 11f of the casing 21 from the base end opening of the internal cylinder 60. Then, when the heating gas flows upwards in the gravity direction on the outside of the internal cylinder 60, a part of the heat of the heating gas is transferred to the external cylinder 52 and is further transferred to the fin arranged between the external cylinders 52 and 52. When the heating gas flows through the catalyst layer 63, unreacted hydrogen contained in the heating gas is subjected to catalytic combustion by the purification catalyst carried in the catalyst layer 63, and gas temperature rises. A part of the heat of this heating gas is transferred through the internal cylinder 60 to heat the heating gas flowing on the outside of the internal cylinder 60. In addition, in the case in which a very small quantity of emission such as CO exists in the heating gas, the purification catalyst subjects the emission to catalytic combustion to purify the heating gas.

In this superheating unit 50, since the inner projections and the outer projections 61 of the internal cylinders 60 agitate the heating gas flowing through the heating fluid passage 72 sufficiently, heat transfer performance is also improved.

Then, as shown in FIG. 4, the heating gas, having flowed out to the heating fluid receiving box 11f, flows in the heat retaining chamber 17 between the housing 10 and the casing 21 through the upper opening 11g of the heating fluid receiving box 11f and is exhausted from the heating fluid outlet pipe 3 while flowing along the periphery of the casing 21.

Next, flow of the liquid fuel will be described. The liquid fuel supplied to the liquid fuel nozzles 4 is injected obliquely downwards from a large number of injection holes (not shown) provided in the liquid fuel nozzles 4 in the inside of the casing 21 and flows in the space between the external cylinders 32 in the evaporation unit 30, that is, the heated fluid passage 81. In other words, in this embodiment, the free end side of the external cylinder 32 is an inlet port for the liquid fuel.

The liquid fuel injected from the liquid fuel nozzles 4 changes to droplets, flows in the heated fluid passage 81 from the space between the external cylinders 32, and adheres to the fin 36 to flow down along the surface thereof or passes through gap formed in the fin 36 to fall. In any case, the liquid fuel flows downwards in the gravity direction in the heated fluid passage 81. Then, the liquid fuel adhered to the surface of the external cylinder 32 and the surface of the fin 36 exchanges heat with the high-temperature heating gas flowing through the heating fluid passage 71 between the external cylinder 32 and the internal cylinder 40 via the external cylinder 32 and the fin 36 to instantly vaporize into vaporized fuel. In addition, the liquid fuel, which passes through the gaps in the fin 36 to fall, also vaporizes into vaporized fuel under the high-temperature atmosphere in the heated fluid passage 81 while the liquid fuel falls in the heated fluid passage 81.

Here, since the fin 36 is provided in the heated fluid passage 81 of the evaporation unit 30, the liquid fuel tends to spread widely, and a surface area of a heating surface is extremely large. As a result, vaporization of the liquid fuel is facilitated.

In addition, when the liquid fuel collides against the fin 36, the liquid fuel adheres to portions against which the liquid fuel has collided (hereinafter referred to as collided portions) and, at the same time, scatters. The liquid fuel having scattered collides against the fin 36 near the collided portions again. Since the liquid fuel repeats such collision, a frequency of contact of the liquid fuel on the surface of the fin 36 serving as the heating surface increases, and vaporization of the liquid fuel is facilitated.

In addition, a temperature distribution over the entire fin 36 in the heated fluid passage 81 is made substantially uniform by the heat transfer of the fin 36. Thus, the entire area of the heated fluid passage 81 can be used as a heat exchange unit, and the liquid fuel can be efficiently converted into a vaporized fuel.

Therefore, this evaporator 1 can vaporize the liquid fuel extremely efficiently and promptly and is extremely superior in response.

Note that it is preferable to provide the fin 36 in multiple stages in the vertical direction and to arrange projecting portions in an offset manner in the vertically arranged fin 36. In this way, the frequency of collision of the liquid fuel against the fin 36 further increases, and vaporization of the liquid fuel is further facilitated.

In addition, the heated fluid passage 81 is generally surrounded by the external cylinders 32. In other words, the heated fluid passage 81 is generally surrounded by the heating fluid passage 71. Thus, heat radiation from vaporized fuel flowing through the heated fluid passage 81 can be controlled, and a decrease in the temperature of generated vaporized fuel can be prevented.

The vaporized fuel generated in this way falls in the gravity direction in the heated fuel passage 81.

The vaporized fuel having reached the lower part of the heated fluid passage 81 in the evaporation unit 30 passes the lower side of the partition plate 28 in the casing 21, flows in the heated fluid passage 82 of the superheating unit 50, and flows upwards in the gravity direction in the respective spaces among the external cylinders 52 in the superheating unit 50. Then, while the vaporized fuel flows upwards in the gravity direction in the heated fluid passage 82, the vaporized fuel exchanges heat with the heating gas, which flows in the heating fluid passage 72 between the external cylinders 52 and the internal cylinders 60, via the fin provided among the external cylinders 52, and is further heated.

Then, the vaporized fuel having reached the upper part in the casing 21 in the superheating unit 50 is exhausted to the vaporized fuel outlet pipe 5 from the vaporized fuel outlet hole 24d of the casing 21 through the cylinder 24e and the vaporized fuel outlet hole 16a of the housing 10 and is supplied to the reformer 101 via a pipe which is not shown.

In this way, in this evaporator 1, the vaporized fuel flows from the evaporation unit 30 to the superheating unit 50, and the heating gas also flows from the evaporation unit 30 to the superheating unit 50. That is, the fuel stream and the heating gas flow in parallel with each other. When the vaporized fuel and the heating gas are allowed to flow as parallel flows, changes in a degree of superheating of the vaporized fuel with respect to a change in a flow rate of the heating gas can be controlled, and changes in the temperature of the vaporized fuel can be controlled.

In addition, in the evaporator 1 in which the catalyst layers 43 and 63 are provided in the heating fluid passages 71 and 72 of the evaporation unit 30 and the superheating unit 50, hydrogen in the heating gas, which has not been combusted in the catalyst layer 43, can be burnet in the catalyst layer 63, and passing through of hydrogen (i.e., incomplete combustion of hydrogen) can be prevented.

In addition, since both the flowing directions of the vaporized fuel and the heating gas are the direction along the axial direction of the external cylinders 32 and 52 and the internal cylinders 40 and 60 (gravity direction) in both the evaporation unit 30 and the superheating unit 50, compared with the case in which the flowing directions of the vaporized fuel and the heating gas are crossed, temperature distribution in the horizontal direction of the external cylinders 32 and 52 and the internal cylinders 40 and 60 can be made substantially uniform. Therefore, thermal distortion can be prevented from occurring in the horizontal direction of the external cylinders 32 and 52 and the internal cylinders 40 and 60, and thermal stress can be prevented from being caused.

Note that the heat retaining chamber 17 provided between the housing 10 and the casing 21 surrounds the periphery of the heat exchange unit 20, and the heating gas flowing through the heat retaining chamber 17 has sufficiently high temperature even after the heat exchange. Thus, the heating gas in the heat retaining chamber 17 acts as a heat retaining layer to control heat radiation from the heat exchange unit 20 and prevents the temperature of the generated vaporized fuel from falling.

In addition, in this evaporator 1, as described above, both the respective external cylinders 32 and the respective internal cylinders 40 of the evaporation unit 30 and the respective external cylinders 52 and the respective internal cylinders 60 of the superheating unit 50 are cantilevered at the base ends thereof and have free ends at the tip sides thereof. Thus, when the respective external cylinders 32 and 52 and the respective internal cylinders 40 and 60 have thermally expanded, the cylinders extend to the tip sides, respectively, whereby thermal distortion can be absorbed, and thermal stress can be prevented from being caused. Therefore, thickness and weight of the external cylinders 32 and 52 and the internal cylinders 40 and 60 can be reduced.

In addition, since the catalyst layers 43 and 63 are provided at tip portions of the internal cylinders 40 and 60, a part where high temperature is generated by catalytic combustion can be placed away from the base portions which are the cantilevered sides of the internal cylinders 40 and 60, and thermal stress applied to the connecting portions of the internal cylinders 40 and 60 and the bottom plate 22 can be reduced. Therefore, durability of the evaporator 1 is improved.

Furthermore, since thermal stresses in the connecting portion of the external cylinder assemblies 31 and 51 and the skirt 23 and the connecting portion of the internal cylinders 40 and 60 and the bottom plate 22 are small, rigidity of the bottom plate 22 and the skirt 23 can be set low. As a result, thickness and weight of the bottom plate 22 and the skirt 23 can be reduced.

Moreover, since all the cantilevered sides of the external cylinders 32 and the internal cylinders 40 of the evaporation unit 30 and the external cylinders 52 and the internal cylinders 60 of the superheating unit 50 are arranged on the same side, the structure of the evaporator 1 can be simplified.

Therefore, reduction in weight, simplification of the structure, and reduction in costs of the evaporator 1 can be realized.

In addition, since the vaporized fuel outlet pipe 5 is provided in the top plate 16 of the housing 10, discharge of droplets, which is not preferable for a reaction in the reformer 101, can be prevented. Moreover, droplets, which are generated at the time when operation of the evaporator 1 is stopped, can be prevented from being discharged to the reformer 101.

Moreover, in the case in which this evaporator 1 is mounted on a fuel cell automobile, it is probable that the orientation of the evaporator 1 will incline more or less. However, even if the evaporator 1 inclines, in this evaporator 1, since the fin 36 provided in the heated fluid passage 81 of the evaporator 30 acts as a partition wall, the liquid fuel can be prevented from flowing only in a part of the area in the heated fluid passage 81. As a result, since a substantial heat transfer area can be prevented from being changed, evaporation performance can be maintained constant.

Figure 14:
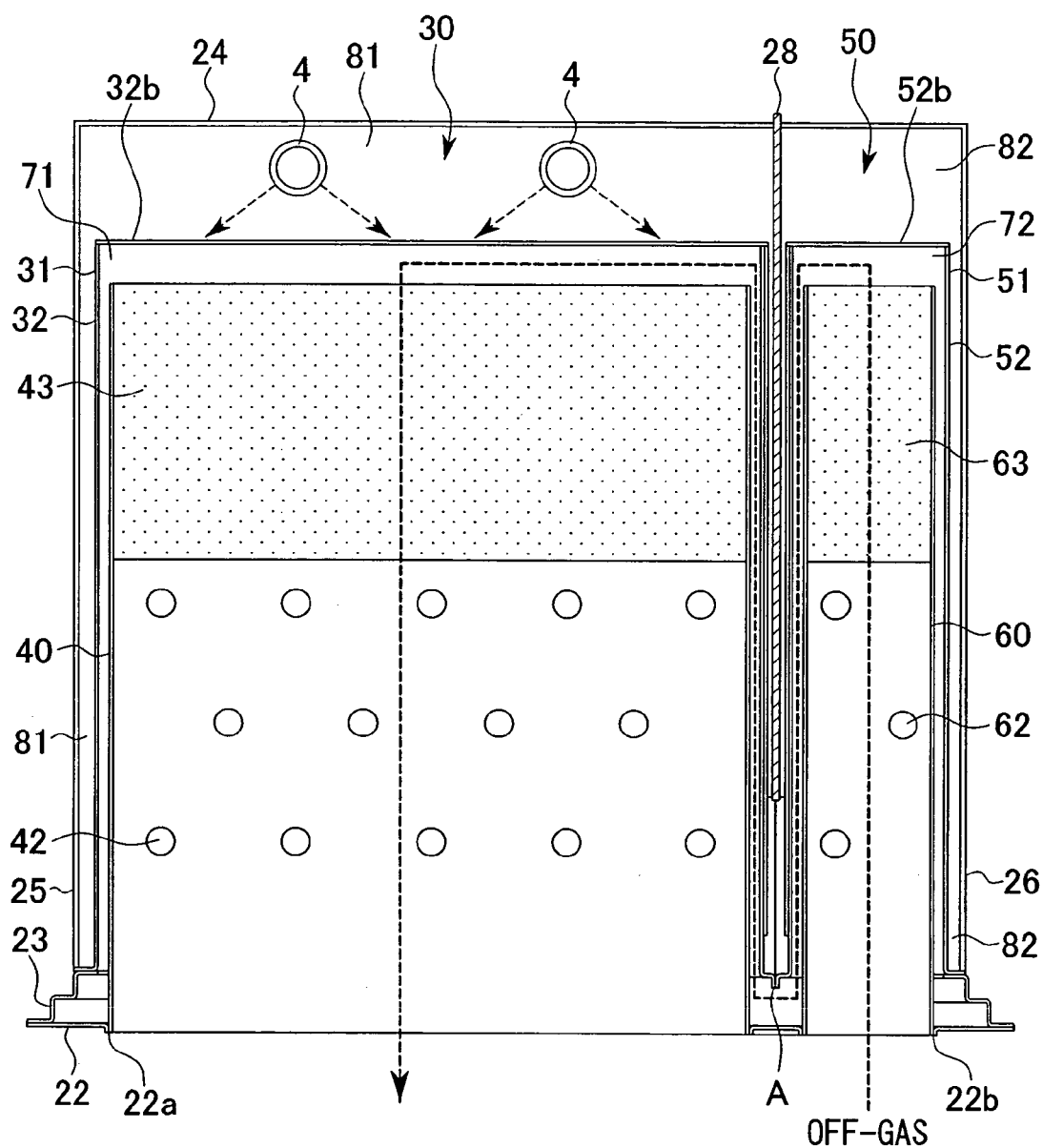
FIG. 14 is a longitudinal sectional view of the heat exchange unit and is an explanatory view in the case in which flow direction of a heating fluid is reversed.

Note that, in the heat exchange unit 20, it is also possible for flowing directions of the fuel and the vaporized fuel to be set to be the same as described above, and only flow direction of the heating gas is set to the opposite of the above-described case. In other words, as shown in FIG. 14, it is also possible for the heating gas to flow in from the internal cylinder 60 of the superheating unit 50, to flow through from the inside to the outside of the internal cylinder 60, and to flow through the outside of the internal cylinder 40 of the evaporation unit 30, and then to flow to the inside of the internal cylinder 40.

Consequently, the vaporized fuel flows from the evaporation unit 30 to the superheating unit 50, and the heating gas flows from the superheating unit 50 to the evaporation unit 30. That is, the vaporized fuel and the heating gas flow in parallel with each other. When the vaporized fuel and the heating gas flow in opposing flow directions, the temperature of the vaporized fuel can be brought close to the temperature of the heating gas, and response of temperature control of the vaporized fuel is improved.

In particular, since the catalyst layer 63 of the superheating unit 50 is located on the upstream side in the flowing direction of the heating gas, a caloric value of the heating gas in the catalyst layer 63 of the superheating unit 50 can be increased. As a result, the vaporized fuel can receive a large quantity of heat from the catalyst layer 63 near the terminal end of the superheating unit 50, and response of temperature control of the vaporized fuel can be significantly improved.

Figure 15B:
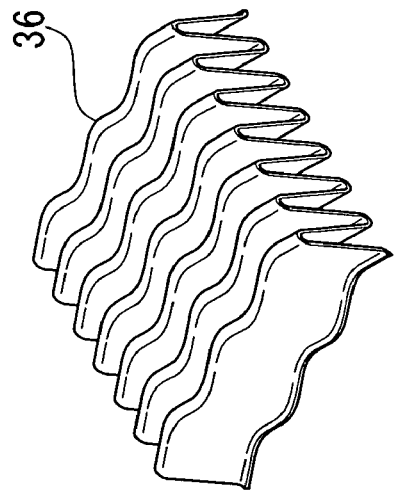
FIGS. 15A to 15E are perspective views showing examples of a fin used in the evaporator.
Figure 15E:
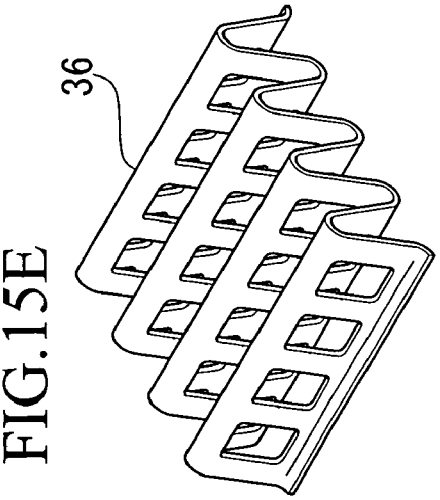
Figure 15A:
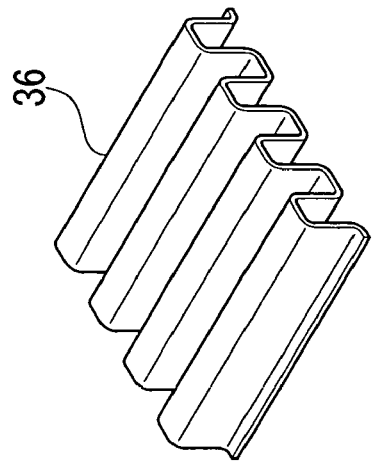
Figure 15D:
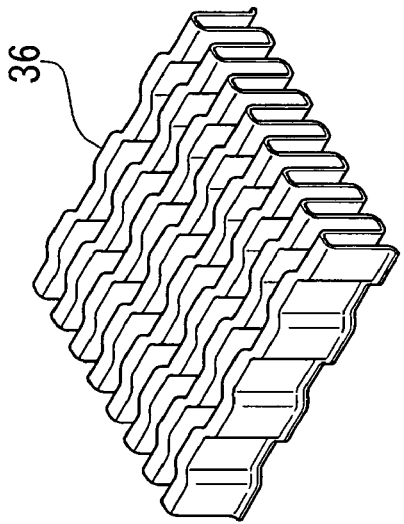
Figure 15C:
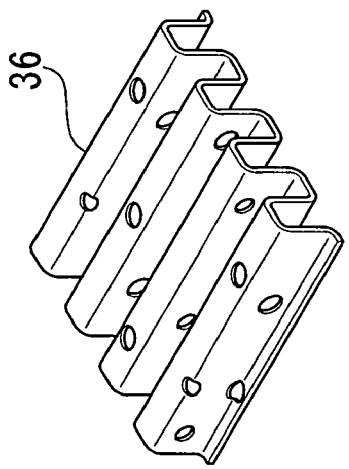

Note that the shape of the fin 36 provided in the heated fluid passages 81 and 82 is not limited to a substantial triangular corrugated shape, and it is possible to adopt various shapes as shown in FIGS. 15A to 15E. FIG. 15A shows a fin of a rectangular corrugated shape in section, FIG. 15B shows a so-called heliborne fin, FIG. 15C shows a porous plate fin, FIG. 15D shows a so-called cerate fin, and FIG. 15E shows a so-called louver fin. Heat exchange efficiency can be further improved by adopting these fins. In addition, it is also possible to provide a projected portion on the outer surfaces of the external cylinders 32 and 52 by an embossing process to use this projected portion instead of the fin 36.

Second Embodiment

Next, a second embodiment of the evaporator in accordance with the present invention will be described with reference to FIGS. 16 and 17. The evaporator in the second embodiment can be used instead of the evaporator 1 in the fuel improving system shown in FIG. 1.

Figure 16:
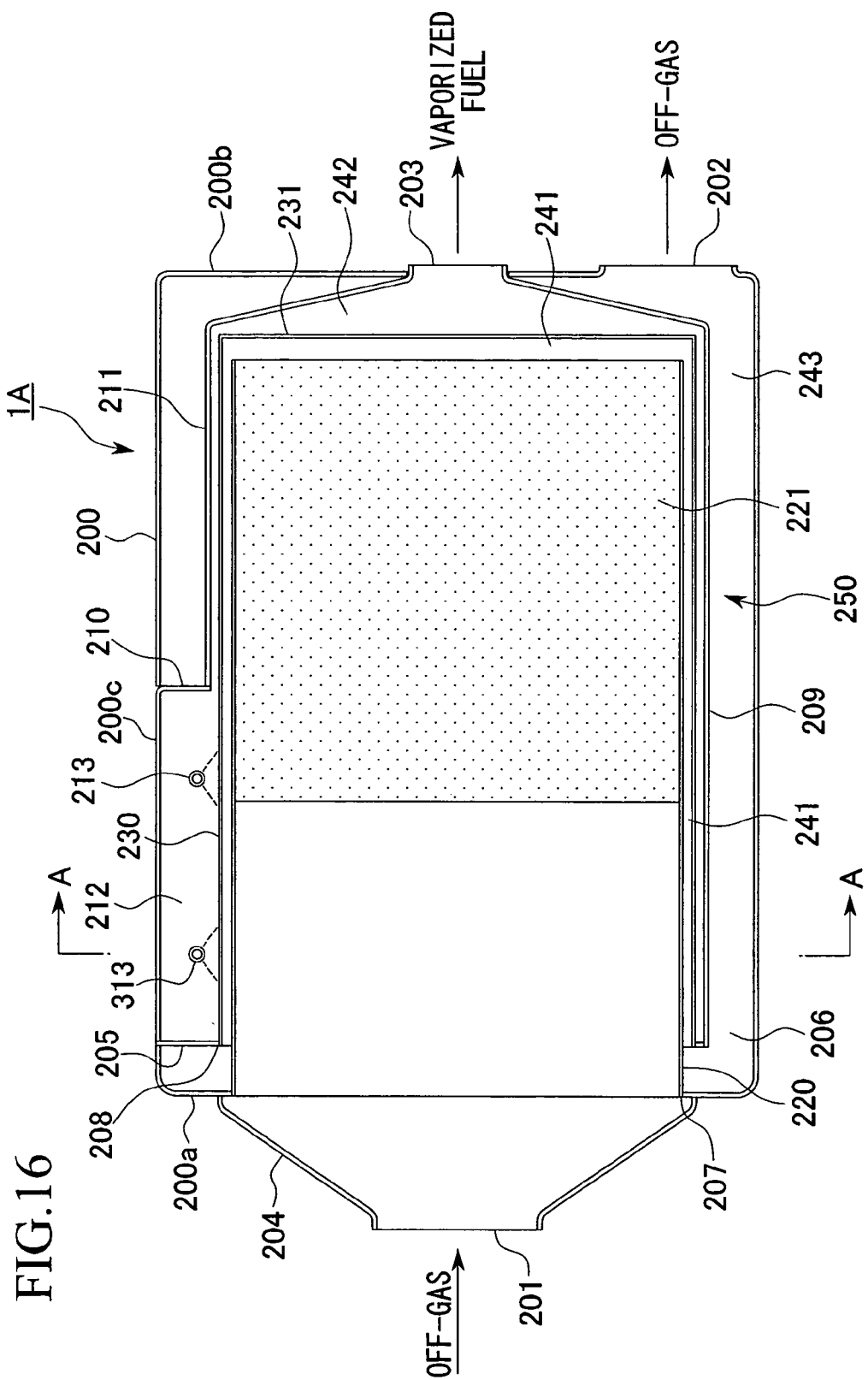
FIG. 16 is a longitudinal sectional view in a second embodiment of the evaporator in accordance with the present invention.

As shown in FIG. 16, an evaporator 1A includes a housing 200 of a rectangular box shape. A heating fluid inlet 201 is provided in a front part of the housing 200, and a heating fluid outlet 202 and a vaporized fuel outlet 203 are provided in a rear part the housing 200. In this evaporator 1A, the inside of the housing 200 forms an evaporation unit (heat exchanger) 250.

The heating fluid inlet 201 is provided in a heating fluid inlet hood 204 which is fixed to a front plate 200a of the housing 200. Inside the housing 200, a partition plate 205 is set in the vertical direction in parallel with the front plate 200a so as to close the housing 200 leaving a bottom clearance 206.

In the front plate 200a of the housing 200, a large number of oblong holes 207, which are made to be longer in the vertical direction, are provided at a predetermined interval in parallel with each other. In the partition plate 205, a large number of oblong holes 208, which are made to be longer in the vertical direction, are also provided in association with the oblong holes 207, respectively. Note that the oblong holes 208 of the partition plate 205 are formed slightly larger than the oblong holes 207. In addition, the heating fluid inlet hood 204 is provided so as to surround all the oblong holes 207 of the front plate 200a.

One internal cylinder 220 is attached to each of the oblong holes 207 of the front plate 200a, and one external cylinder 230 is attached to each of the oblong holes 208 of the partition plate 205.

The external cylinder 230 is formed in a flattened cylindrical shape in the vertical direction, has an axis extending straightly from a front side to a rear side of the housing 200 horizontally, and opens only at a base end and closes at a tip thereof. The base end is inserted and fixed to the oblong hole 208 of the partition plate 205, and the tip is extended close to a rear plate 200b of the housing 200.

The internal cylinder 220 is formed in a flattened cylindrical shape in the vertical direction, has an axis extending straightly from a front side to a rear side of the housing 200 horizontally, and opens at both ends. A base end thereof is inserted and is fixed to the oblong hole 207 of the front plate 200a, and a tip side thereof is inserted in the inside of the external cylinder 230 from the oblong hole 208.

Figure 17:
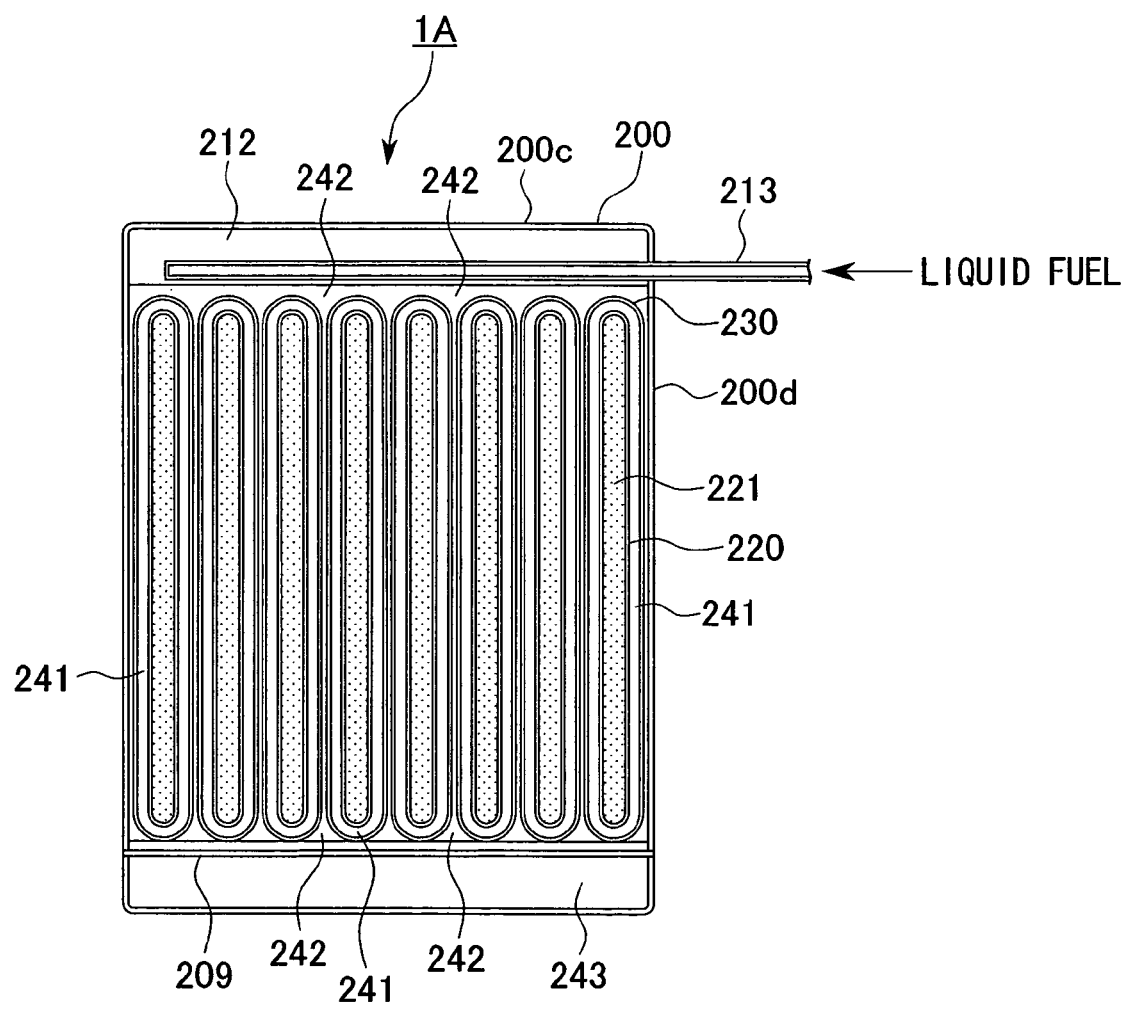
FIG. 17 is a sectional view along line A-A in FIG. 16.

As shown in FIG. 17, a predetermined clearance is secured between an outer peripheral surface of the internal cylinder 220 and an inner peripheral surface of the external cylinder 230, and the tip of the internal cylinder 220 is located apart from the a tip closing portion 231 of the external cylinder 230 by a predetermined length.

In this way, in the evaporator 1A, the respective external cylinders 320 are cantilevered at base ends thereof and form free ends at the tip sides thereof, and the respective internal cylinders 220 are also cantilevered at base ends thereof and form free ends at the tip sides thereof. Thus, even in the case in which the internal cylinder 220 and the external cylinder 230 thermally expand due to heat applied to the cylinders, since the internal cylinder 220 and the external cylinder 230 extend to the tip sides, respectively, thermal stress is not caused.

A catalyst layer 221, which is formed with, for example, a Pt oxidation catalyst carried on a honeycomb carrier, is provided at the tip side inside the internal cylinder 220.

In addition, a partition plate 209, which is arranged apart from the external cylinder 230, provided on a lower side of the external cylinder 230 is provided in the inside of the housing 200. The partition plate 209 is coupled to a lower end of the partition plate 205 and both inner side surfaces of the housing 200 and is bent obliquely upwards in the vicinity of the tip of the external cylinder 230 to be coupled to the rear plate 200b of the housing 200. A coupling portion with the rear plate 200b converges on a periphery of the vaporized fuel outlet 203.

Furthermore, in the inside of the housing 200, a downward-extended plate 210, which is extended downwardly from a top plate 200c of the housing 200, is provided in a position a predetermined length apart to the rear surface side of the housing 200 from the partition plate 205. Both sides of the downward-extended plate 210 are coupled to both the inner side surfaces of the housing 200. A lower end of the downward-extended plate 210 is located above and apart from the external cylinder 230, and a partition plate 211 is coupled to the lower end of the downward-extended plate 210.

The partition plate 211 is coupled to both the inner side surfaces of the housing 200 and is bent obliquely downwards in the vicinity of the tip of the external cylinder 230 to be coupled to the rear plate 200b of the housing 200. A coupling portion with the rear plate 200b converges on a periphery of the vaporized fuel outlet 203.

Moreover, in a space 212 which is formed in the inside of the housing 200 and between the partition plate 205 and the downward-extended plate 210, two liquid fuel nozzles 213, which are inserted piercing a side plate 200d of the housing 200, are set. As shown in FIG. 17, both the two liquid fuel nozzles 213 and 213 extend such that the axes thereof are arranged horizontally and in a direction perpendicular to a direction along which the external cylinders 230 are arranged to be adjacent to each other. The two liquid fuel nozzles 213 and 213 are arranged at the same height in parallel with each other, and are set above and apart from the external cylinder 230.

In this evaporator 1A, in the inside of the external cylinder 230, a heating fluid passage 241, which turns around from the inside to the outside of the internal cylinder 220 at the tip of the internal cylinder 220, is formed, a heated fluid passage 242 is formed between the adjacent external cylinders 230 and 230 and between the partition plates 209 and 211, a heating fluid discharge passage 243 is formed between the partition plate 209 and the housing 200. Furthermore, the heating fluid passage 241 communicates with the heating fluid inlet 201, the heated fluid passage 242 communicates with the vaporized fuel outlet 203, and the heating fluid discharge passage 243 communicates with the heating fluid outlet 202.

In the evaporator 1A constituted as described above, an off-gas exhausted from the fuel cell 10 is supplied to the heating fluid inlet 201 as a heating gas, and a liquid fuel as a heated fluid is supplied to the liquid fuel nozzles 213.

First, a flow of the heating gas will be described. The heating gas supplied to the heating fluid inlet 201 flows in the respective internal cylinders 220 and flows through the heating fluid passage 241. The heating gas, having flowed in the respective internal cylinders 220, flows toward the tip of the internal cylinder 220 along the axial direction in the internal cylinder 220. When the heating gas passes the catalyst layer 221, hydrogen in the heating gas is combusted, and the heating gas changes to a high-temperature heating gas. When this high-temperature gas is exhausted from the tip of the internal cylinder 220, the heating gas bumps against the tip closing portion 231 of the external cylinder 230 to reverse a direction of flow by 180 degrees and moves around to the outside of the internal cylinder 220, and flows toward the base end between the external cylinder 230 and the internal cylinder 220. Then, when the high-temperature heating gas flows outside the internal cylinder 220, a part of the heat of the heating gas is transferred to the external cylinder 230. When the heating gas bumps against the front plate 200a of the housing 200, the heating gas passes the bottom clearance 206 of the housing 200 to flow in the heating fluid discharge passage 243, and flows to the rear side of the housing 200 in the heating fluid discharge passage 243 to be discharged from the heating fluid outlet 203.

Next, a flow of the liquid fuel will be described. The liquid fuel supplied to the liquid fuel nozzles 213 is injected obliquely downwards from a large number of injection holes (not shown) provided in the liquid fuel nozzles 313 in the space 212 formed in an upper part on the front side in the housing 200. In other words, in this embodiment, a flow inlet of the heated fluid flowing the outside of the external cylinder 230 is provided on the outside in the flat direction of the external cylinder 230, whereby the heated fluid flows in a direction crossing the heating gas flowing on the inside of the external cylinder 230. The liquid fuel injected from the liquid fuel nozzles 313 changes to droplets and adheres to the surfaces of the respective external cylinders 230.

The liquid fuel adhered to the surface of the external cylinder 230 flows down along the surface of the external cylinder 230 and flows downwards in the gravity direction in the heated fluid passage 242. Then, the liquid fuel adhered to the surface of the external cylinder 230 exchanges heat with the high-temperature heating gas, which flows in the heating fluid passage 241 between the external cylinder 230 and the internal cylinder 220, via the external cylinder 230 to instantly vaporize into a vaporized fuel.

Incidentally, the heated fluid passage 242 is generally surrounded by the external cylinders 230. In other words, the heated fluid passage 242 is generally surrounded by the heating fluid passage 241. Thus, heat radiation from the vaporized fuel flowing through the heated fluid passage 242 can be controlled, and the temperature of the generated vaporized fuel can be prevented from falling.

The vaporized fuel generated in this way flows horizontally toward the rear side of the housing 200 in the heated fluid passage 242. During this flow, the vaporized fuel also exchange heat with the high-temperature heating gas, which flows in the heating fluid passage 241 between the external cylinder 230 and the internal cylinder 220, via the external cylinder 230. As a result, the vaporized fuel is heated.

Then, the vaporized fuel having reached the terminal end of the heated fuel passage 242 is discharged from the vaporized fuel outlet 203 of the housing 200 and supplied to the reformer 101 via a pipe which is not shown.

In this evaporator 1A, as described above, both the respective internal cylinders 220 and the respective external cylinders 230 are cantilevered at the base ends thereof and form free ends at the tip sides. Thus, when the respective internal cylinders 220 and the respective external cylinders 230 thermally expand, the cylinders extend to the tip sides, respectively, whereby thermal distortion can be absorbed, and thermal stress is hardly caused. Therefore, thickness and weight of the internal cylinder 220 and the external cylinder 230 can be reduced.

In addition, since the catalyst layer 221 is provided at the tip side of the internal cylinder 220, a part where high temperature is generated by catalytic combustion can be placed away from the base portion which is the cantilevered side of the internal cylinder 220, and thermal stress applied to the connecting portion of the internal cylinder 220 and the front plate 220a can be reduced. Therefore, durability of the evaporator 1A is improved.

Furthermore, since thermal stress in the connecting portion of the internal cylinder 220 and the front plate 200a is small, rigidity of the front plate 200a can be set low. In addition, rigidity of the partition plate 205, which cantilevers the external cylinder 230, can be set low. As a result, thickness of not only the front plate 200a and the partition plate 205 but also of the housing can be reduced, and weight of the evaporator 1A can be reduced.

Therefore, reduction in weight and reduction in costs of the evaporator 1 can be realized.

Third Embodiment

Next, a third embodiment of the evaporator in accordance with the present invention will be described with reference to FIGS. 18 and 19. An evaporator in the third embodiment can be used instead of the evaporator 1 in the fuel reforming system shown in FIG. 1.

Figure 18:
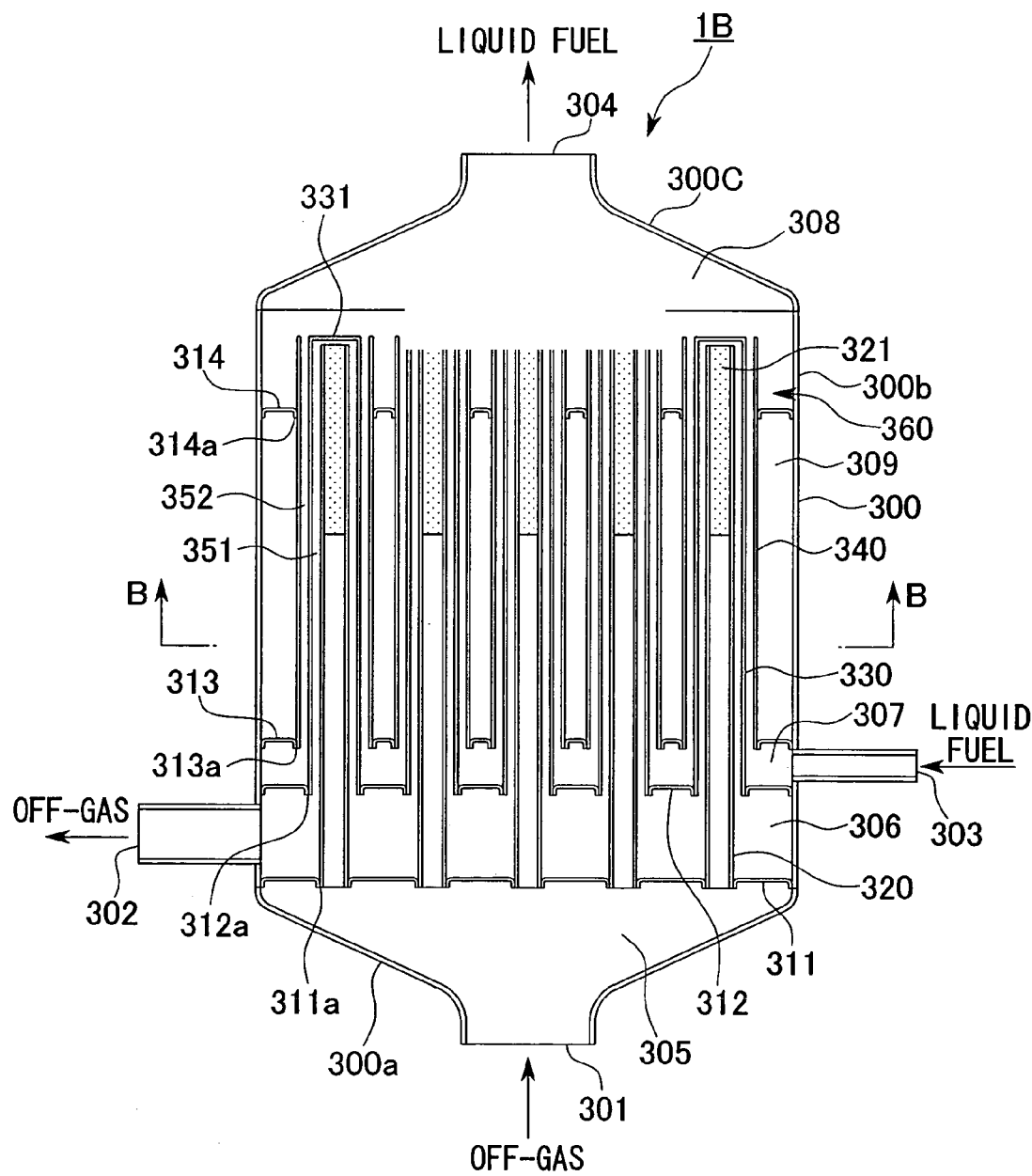
FIG. 18 is a longitudinal sectional view in a third embodiment of the evaporator in accordance with the present invention.
Figure 19:
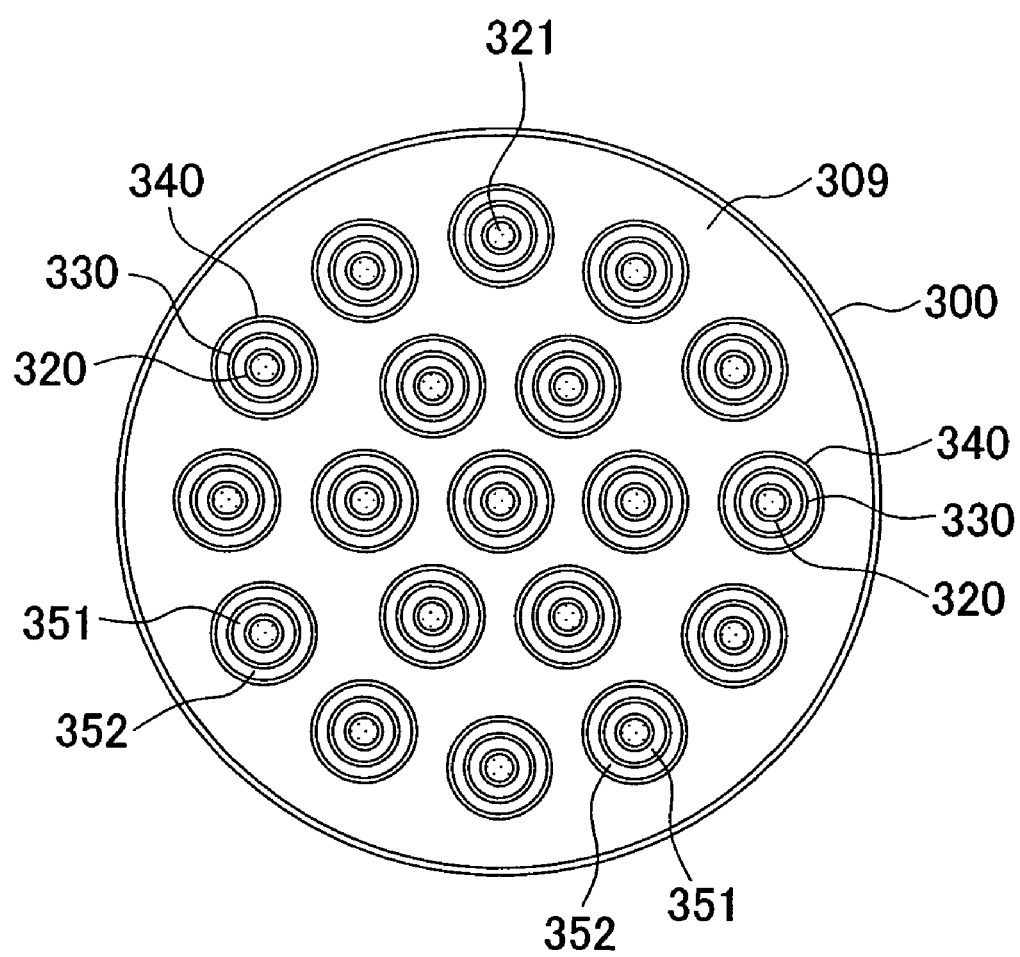
FIG. 19 is a sectional view along line B-B in FIG. 18.

As shown in FIG. 18, an evaporator 1B includes a housing 300 of substantially a cylindrical shape, which has an axis extending in the vertical direction. A heating fluid inlet 301 is provided in a bottom 300a of the housing 300, a heating fluid outlet 302 and a liquid fuel inlet 303 are provided in a body 300b, and a vaporized fuel outlet 304 is provided at a top 300c. In this evaporator 1B, the inside of the housing 300 forms an evaporation unit (heat exchanger) 360.

In the inside of the housing 300, four partition plates 311, 312, 313 and 314, which are horizontal in a surface direction thereof, are set apart from each other in the vertical direction.

The partition plate 311 is arranged in the vicinity of the bottom 300a of the housing 300. A large number of circular holes 311a are pierced and formed in this partition plate 311.

The partition plate 312 is arranged above and apart from the partition plate 311. A large number of circular holes 312a are also pierced and formed in this partition plate 312 concentrically with the holes 311a of the partition plate 311. The holes 312a of the partition plate 312 is formed to have a larger diameter than the holes 311a of the partition plate 311.

The partition plate 313 is arranged further above and apart from the partition plate 312. In this partition plate 313, a large number of circular holes 313a are also pierced and formed concentrically with the holes 311a of the partition plate 311. The holes 313a of the partition plate 313 is formed to have a larger diameter than the holes 312a of the partition plate 312.

The partition plate 314 is arranged further above and apart from the partition plate 313 and in a position close to the top 300c. In this partition plate 314, a large number of circular holes 314a are also pierced and formed concentrically with the holes 311a of the partition plate 311. The holes 314a of the partition plate 314 are formed so as to have a larger diameter than the holes 313a of the partition plate 313.

The heating fluid inlet 301 communicates with a space (hereinafter referred to as a heating fluid dispersion chamber) 305 formed on a lower side of the partition plate 311. The heating fluid outlet 302 communicates with a space (hereinafter referred to as a heating fluid collecting chamber) 306 formed between the partition plate 311 and the partition plate 312. The liquid fuel inlet 304 communicates with a space (hereinafter referred to as an evaporation chamber) 307 formed between the partition plate 312 and the partition plate 313. The vaporized fuel outlet 304 communicates with a space (hereinafter referred to as a vaporized fuel collecting chamber) 308 formed on an upper side of the partition plate 314.

One internal cylinder 320 is attached to each of the holes 311a of the partition plate 311, and one external cylinder 330 is attached to each of the holes 312a of the partition plate 312. One outermost cylinder 340 is attached to each of the holes 313a of the partition plate 313 and the holes 314a of the partition plate 314 corresponding to the holes 313a.

The outermost cylinder 340 is formed in a cylindrical shape with both ends opened and its axis is vertical. A base end thereof is inserted and fixed to the hole 313a of the partition plate 313 and a tip side thereof pierces through the hole 314a of the partition plate 314 and extends further upwards.

The external cylinder 330 is formed in a cylindrical shape with only a base end thereof opened and a tip thereof closed and its axis is vertical. The base end is inserted and fixed to the hole 312a of the partition plate 312 and a tip side thereof is inserted in the inside of the outermost cylinder 340 from the hole 313a of the partition plate 313. The tip is located at substantially the same height as the tip of the outermost cylinder 340. The external cylinder 330 and the outermost cylinder 340 attached in this way are arranged concentrically, and a heated fluid passage 352 of an annular shape in section is formed between an outer peripheral surface of the cylinder 330 and an inner peripheral surface of the outermost cylinder 340. This heated fluid passage 352 communicates with the evaporation chamber 307 at a lower end thereof and communicates with the vaporized fuel collecting chamber 308 at an upper end thereof.

The internal cylinder 320 is formed in a cylindrical shape with both ends thereof opened and its axis is vertical. A base end thereof is inserted and fixed to the hole 311a of the partition plate 311 and a tip side thereof is inserted in the inside of the external cylinder 330 from the hole 312a of the partition plate 312. A tip of the internal cylinder 320 is located apart from a tip closing portion 331 of the external cylinder 330 by a predetermined length. The internal cylinder 320 and the external cylinder 330 attached in this way are arranged concentrically. A predetermined clearance is secured between an outer peripheral surface of the internal cylinder 320 and an inner peripheral surface of the external cylinder 330. A heating fluid passage 351, which turns around from the inside to the outside of the internal cylinder 320 at the tip of the internal cylinder 320, is formed inside the external cylinder 330. This heating fluid passage 351 communicates with the heating fluid dispersion chamber 305 at one end thereof (lower opening of the internal chamber 320) and communicates with the heating fluid collecting chamber 306 at the other end (lower opening of the external cylinder 330).

As described above, in the evaporator 1B, the respective external cylinders 330 are cantilevered at base ends thereof and form free end at tip sides thereof, and the respective internal cylinders 320 are also cantilevered at base ends thereof and form free ends at tip sides thereof. Thus, even in the case in which the internal cylinder 320 and the external cylinder 330 expand due to heat applied to the cylinders, the internal cylinder 320 and the external cylinder 330 extend to the tip sides, respectively, and thermal stress is not caused.

At the tip side in the inside of the internal cylinder 320, a catalyst layer 321, which is formed with, for example, a Pt oxidation catalyst carried on a honeycomb carrier, is provided.

Note that a space formed between the partition plate 313 and the partition plate 314 and on the outside of the outermost cylinder 340 is completely closed and constitutes a heat insulating chamber 309 in which the air filled in the inside thereof acts as a heat insulating layer.

In the evaporator 1B constituted as described above, an off-gas exhausted from the fuel cell 110 is supplied to the heating fluid inlet 301 as a heating gas, and the liquid fuel as the heated fluid is supplied to the liquid fuel inlet 303.

First, a flow of the heating gas will be described. The heating gas supplied to the heating fluid inlet 301 flows in the respective internal cylinders 320 via the heating fluid dispersion chamber 305 and flows through the heating fluid passage 351. In other words, the heating gas, having flowed in the respective internal cylinders 320, flows upwards in the gravity direction in the internal cylinder 320. When the heating gas flows through the catalyst layer 321, hydrogen in the heating gas is combusted, and the heating gas changes to a high-temperature heating gas. When this high-temperature gas is exhausted from the tip of the internal cylinder 320, the heating gas bumps against the tip closing portion 331 of the external cylinder 330 to reverse the direction of flow by 180 degrees and moves around to the outside of the internal cylinder 320, and flows downwards in the gravity direction between the external cylinder 330 and the internal cylinder 320. Then, when the high-temperature heating gas flows outside the internal cylinder 320, a part of the heat of the heating gas is transferred to the external cylinder 330.

The heating gas, having flowed downwards in the gravity direction between the external cylinder 330 and the internal cylinder 320, is exhausted to the heating fluid collecting chamber 306 from the lower end opening of the external cylinder 330, and is further exhausted from the heating fluid outlet 302. Then, when the heating gas passes through the heating fluid collecting chamber 306, a part of the heat of the heating gas is transferred to the partition plate 312.

Next, a flow of the liquid fuel will be described. The liquid fuel supplied from the liquid fuel inlet 303 to the evaporation chamber 307 spreads over the surface of the partition plate 312. In other words, in this embodiment, the base end side of the external cylinder 330 is an inlet port for the liquid fuel.

The liquid fuel, having spread over the surface of the partition plate 312, exchanges heat with the heating gas of the heating fluid collecting chamber 306 via the partition plate 312 so as to be converted into a vaporized fuel.

This vaporized fuel flows in the heated fluid passage 352 from an opening between the outermost cylinder 340 and the external cylinder 330 and flows upwards in the gravity direction in the heated fluid passage 352. During this flow, the vaporized fuel also exchanges heat with the high-temperature heating gas flowing in the heating fluid passage 351 between the external cylinder 330 and the internal cylinder 320. As a result, the vaporized fuel is heated.

Since the heated fluid passage 352 is surrounded by the heat insulating chamber 309 containing the air as a heat insulating layer, heat radiation from the vaporized fuel passing through the heated fluid passage 352 can be controlled, and the temperature of the generated vaporized fuel can be prevented from falling.

Then, the vaporized fuel having reached the upper end of the heated fluid passage 352 is exhausted to the vaporized fuel collecting chamber 308 from the upper opening of the outermost cylinder 340 and is further exhausted from the vaporized fuel outlet 304 of the housing 300 to be supplied to the reformer 101 via a pipe which is not shown.

In this evaporator 1B, as described above, both the respective internal cylinders 320 and the respective external cylinders 330 are cantilevered at the base ends thereof and form free ends at the tip sides. Thus, when the respective internal cylinders 320 and the respective external cylinders 330 thermally expand, the cylinders extend to the tip sides, respectively, whereby thermal distortion can be absorbed, and thermal stress is hardly caused. Therefore, thickness and weight of the internal cylinder 320 and the external cylinder 330 can be reduced.

In addition, since the catalyst layer 321 is provided at the tip side of the internal cylinder 320, a part where high temperature is generated by catalytic combustion can be placed away from the base portion which is the cantilevered side of the internal cylinder 320, and thermal stress applied to the connecting portion of the internal cylinder 320 and the partition plate 311 can be reduced. Therefore, durability of the evaporator 1B is improved.

Furthermore, since thermal stress in the connecting portion of the internal cylinder 320 and the partition plate 311 is small, rigidity of the partition plate 311 can be set low. In addition, rigidity of the partition plate 312, which cantilevers the external cylinder 330, can be set low. As a result, thickness of not only the partition plates 311 and 312 but also of the housing 300 can be reduced, and weight of the evaporator 1B can be reduced.

Moreover, since the internal cylinder 320, the external cylinder 330, and the outermost cylinder 340 are circular, these cylinders can be constituted by a commercially available pipe, and the structure of the evaporator 1B is also simplified.

Therefore, reduction in weight, simplification of the structure, and reduction in costs of the evaporator 1 can be realized.

In addition, since the vaporized fuel outlet 304 is provided at the top 300c of the housing 300, discharge of droplets, which is not preferable for a reaction in the reformer 101, can be prevented. Moreover, droplets, which are generated at the time when operation of the evaporator 1B is stopped, can be prevented from being discharged to the reformer 101.

Other Embodiments

Note that the present invention is not limited to the above-described embodiment.

For example, in the above-described embodiments, the external cylinder is set along the vertical direction (gravity direction). However, the external cylinder may be set in the horizontal direction. A setting direction for the external cylinder can be determined from layouts of the heat exchanger and the evaporator.

In addition, the evaporator of the present invention is not limited to one which vaporizes a liquid fuel. Furthermore, the heat exchanger can be applied to devices other than the evaporator.

As described above, according to the heat exchanger of the present invention, even if the external cylinder and the internal cylinder thermally expand when used under a high-temperature environment, the external cylinder and the internal cylinder can absorb thermal distortion by extending to the free end side because these cylinders are cantilevered. Therefore, an excellent effect is realized in that thermal stress is not caused, and durability of the heat exchanger is improved. In addition, since thermal stress is not caused, rigidity of the external cylinder and the internal cylinder as well as components associated with these cylinders can be set low. There is also an effect that thickness and weight of these components can be reduced.

According to another thermal exchanger of the present invention, temperature distribution of the external cylinder and the internal cylinder in a direction perpendicular to the axial direction of the external cylinder and the internal cylinder can be made substantially uniform. Thus, thermal distortion can be prevented from occurring, and thermal stress can be prevented from being caused.

According to another heat exchanger of the present invention, heat radiation from a fluid flowing on the outside of the external cylinder can be controlled, and a fall in the temperature of the fluid can be controlled.

According to another heat exchanger of the present invention, a heat transfer area of the external cylinder is increased by the existence of the fin, and heat transfer performance is improved. In addition, since the fluid passage on the outside of the external cylinder is divided into smaller parts by the fin, in particular, in the case in which the fluid flowing on the outside of the external cylinder is a liquid, the liquid never flows only on the one side of the fluid passage, and stable heat exchange can be performed between the heating fluid and the heated fluid.

According to another heat exchanger of the present invention, since the clearance between the external cylinder and the internal cylinder can be maintained constant, the fluid flowing on the inside of the external cylinder can be made to flow uniformly. In addition, since the fluid flowing on the inside of the external cylinder can be agitated by the projected parts, heat transfer performance is improved.

According to another heat exchanger of the present invention, since the external cylinder has the flattened cylindrical shape, it becomes possible to insert a fin, which is generally used in a heat exchanger, between adjacent external cylinders. In addition, by setting supporting sides of the external cylinder and the internal cylinder on the same side, the structure of the heat exchanger can be simplified.

According to another heat exchanger of the present invention, it becomes easy to flow the fluid along the axis of the external cylinder on the outside of the external cylinder.

According to another heat exchanger of the present invention, it becomes easy to form the external cylinder of the flattened cylindrical shape.

According to another heat exchanger of the present invention, it becomes possible to cause the fluid flowing on the outside of the external cylinder to flow in a direction crossing a fluid flowing on the inside of the external cylinder.

According to another heat exchanger of the present invention, since it becomes possible to use a commercially available pipe for the external cylinder and the internal cylinder, manufacturing costs can be reduced.

According to the evaporator of the present invention, even if the external cylinder and the internal cylinder of the evaporation unit thermally expand, the external cylinder and the internal cylinder can absorb thermal distortion by extending to the free end side because these cylinders are cantilevered. Therefore, an excellent effect is realized in that thermal stress is not caused, and durability of the evaporator is improved. In addition, since thermal stress is not caused, rigidity of the external cylinder and the internal cylinder as well as components associated with these cylinders can be set low. There is also an effect that thickness and weight of these components can be reduced. Moreover, there is also an effect in that a heat capacity of the evaporator is reduced by the reduction in thickness and weight, and a start-up time of the evaporator is reduced.

According to another evaporator of the present invention, since the vaporized fuel generated by the evaporation unit can be thermally exchanged with the heating gas in the superheating unit, vaporized fuel of higher temperature can be generated.

According to another evaporator of the present invention, the vaporized fuel and the heating gas flow in parallel with each other, i.e., both the vaporized fuel and the heating gas flow from the evaporation unit to the superheating unit. Thus, changes in a degree of superheating of the vaporized fuel with respect to a change in a flow rate of the heating gas can be controlled, and changes in the temperature of the vaporized fuel can be controlled.

According to another evaporator of the present invention, the vaporized fuel flows from the evaporation unit to the superheating unit, and the heating gas flow in opposing direction with respect to the vaporized fuel, i.e., flows from the superheating unit to the evaporation unit. Thus, the temperature of the vaporized fuel can be brought close to the temperature of the heating gas, and response of temperature control of the vaporized fuel is improved.

According to another evaporator of the present invention, a combustible substance in the heating gas to be supplied to the heating fluid passage of the evaporation unit can be subjected to catalytic combustion to increase the temperature of the heating gas. Thus, a quantity of generation of the vaporized fuel can be increased, and performance of the evaporator is improved.

According to another evaporator of the present invention, a combustible substance in the heating gas flowing through the heating fluid passage of the superheating unit can be subjected to catalytic combustion to increase the temperature of the heating gas. Thus, the temperature of the vaporized fuel can be increased.

According to another evaporator of the present invention, it becomes possible to set the catalyst easily. Thus, manufacturing of the evaporator is facilitated.

According to another evaporator of the present invention, the supporting portion of the internal cylinder can be provided apart from a part heated by catalytic combustion. Thus, thermal stress applied to the supporting portion can be reduced.

According to another evaporator of the present invention, heat of the evaporation unit can be retained using exhaust heat of the heating gas, and heat radiation from the evaporation unit can be controlled. Thus, performance of the evaporator is improved.

What is claimed is:

1. A heat exchanger comprising:
   a casing;
   a plurality of external cylinders, each of said plurality of external cylinders having a flattened cylindrical shape and comprising
      a corrugated plate formed by bending a single plate so as to be corrugated,
      side plates closing both lateral sides of the corrugated plate, and
      a closed end portion,
      wherein each of said external cylinders has an axis extending in a gravitational direction and is arranged inside the casing with a clearance formed between each of said external cylinders and an inner surface of the casing, and is supported in a cantilevered manner such that an end of each of said external cylinders is fixed to form a fixed end, wherein said plurality of external cylinders are coupled to each other at the fixed ends thereof;
   a first fluid passage formed between the plurality of external cylinders and the casing;
   a plurality of internal cylinders, each of said plurality of internal cylinders having a flattened cylindrical shape that is open at both ends, wherein each internal cylinder is arranged inside one of the plurality of external cylinders with a clearance formed between the internal cylinder and an inner surface of the one of the plurality of external cylinders and is supported in a cantilevered manner such that an end of each of the plurality of internal cylinders, corresponding to the fixed end of each of the plurality of external cylinders, is fixed;
   a second fluid passage formed between each of said plurality of internal cylinders and each of said plurality of external cylinders, which is turned around at the closed end portion of the external cylinder; and
   a liquid injection nozzle arranged above the closed end portion of one of said plurality of external cylinders as viewed in the gravitational direction.

2. The heat exchanger according to claim 1, wherein one of the first fluid passage and the second fluid passage is a heating fluid passage and the other is a heated fluid passage.

3. The heat exchanger according to claim 1, wherein a fluid flowing inside one of the external cylinders flows turning around on the inside of the closed end portion of the external cylinder, and a fluid flowing outside the external cylinder flows along an axial direction of the external cylinder.

4. The heat exchanger according to claim 1, wherein fluid passages are formed between the external cylinders.

5. The heat exchanger according to claim 1, further comprising a fin provided on the outside of at least one of the plurality of external cylinders.

6. The heat exchanger according to claim 1, further comprising plural projecting portions formed on an outer surface of the plurality of internal cylinders.

7. The heat exchanger according to claim 1, further comprising an inlet port for a fluid flowing on the outside one of plurality of external cylinders provided at a free-end side of the external cylinder.

8. An evaporator comprising an evaporation unit including the heat exchanger according to claim 1,
   wherein one of the first fluid passage and the second fluid passage is a heating fluid passage, and the other is a heated fluid passage, and
   wherein the heated fluid is a fluid fuel and vaporized fuel generated by vaporizing the fluid fuel, and the heating fluid is a heating gas.

9. The evaporator according to claim 8, further comprising a superheating unit which heats the vaporized fuel generated by the evaporation unit by heat exchange with the heating gas, and the superheating unit comprises the heat exchanger according to claim 1.

10. The evaporator according to claim 9, wherein the heating gas flows from the heating fluid passage of the evaporation unit to the heating fluid passage of the superheating unit.

11. The evaporator according to claim 9, wherein the heating gas flows from the heating fluid passage of the superheating unit to the heating fluid passage of the evaporation unit.

12. The evaporator according to claim 8, wherein a catalyst is provided in the heating fluid passage of the heat exchanger constituting the evaporation unit.

13. The evaporator according to claim 9, wherein a catalyst is provided in the heating fluid passage of the heat exchanger constituting the superheating unit.

14. The evaporator according to claim 12, wherein the heating fluid passage is formed inside each of the plurality of external cylinders, and the catalyst is provided inside each of the plurality of internal cylinders.

15. The evaporator according to claim 13, wherein the heating fluid passage is formed inside each of the plurality of external cylinders, and the catalyst is provided inside each of the plurality of internal cylinders.

16. The evaporator according to claim 14, wherein the catalyst is provided at a free-end side of each of the plurality of internal cylinders.

17. The evaporator according to claim 15, wherein the catalyst is provided at a free-end side of each of the plurality of internal cylinders.

18. The evaporator according to claim 8, further comprising a heat retaining unit disposed around the evaporation unit,
   wherein the heating gas, which is exhausted through the heating fluid passage of the evaporation unit, flows through the heat retaining unit.

* * * * *

UNITED STATES PATENT AND TRADEMARK OFFICE
CERTIFICATE OF CORRECTION

PATENT NO. : 7,530,389 B2 Page 1 of 1
APPLICATION NO. : 10/819851
DATED : May 12, 2009
INVENTOR(S) : Nobuyoshi Yoshida et al.

It is certified that error appears in the above-identified patent and that said Letters Patent is hereby corrected as shown below:

On the Title Page, at item [75], line 1, please change "Wako (JP)" to --Utsunomiya-shi (JP)--. At item [75], line 3, please change "Wako (JP)" to --Saitama-shi (JP)--.

Signed and Sealed this

Sixth Day of October, 2009

David J. Kappos
*Director of the United States Patent and Trademark Office*